United States Patent
Xu et al.

(10) Patent No.: US 12,170,569 B1
(45) Date of Patent: Dec. 17, 2024

(54) ADAPTIVE MODULATION AND CODING SCHEMES FOR ENHANCED SPECTRAL EFFICIENCY

(71) Applicant: Cable Television Laboratories, Inc., Louisville, CO (US)

(72) Inventors: Mu Xu, Broomfield, CO (US);
Zhensheng Jia, Superior, CO (US);
Junwen Zhang, Broomfield, CO (US);
Haipeng Zhang, Broomfield, CO (US);
Luis Alberto Campos, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 17/535,099

(22) Filed: Nov. 24, 2021

Related U.S. Application Data

(60) Provisional application No. 63/164,245, filed on Mar. 22, 2021, provisional application No. 63/117,734, filed on Nov. 24, 2020.

(51) Int. Cl.
*H04L 1/00* (2006.01)
*H04L 1/20* (2006.01)
*H04Q 11/00* (2006.01)

(52) U.S. Cl.
CPC ............ *H04L 1/0003* (2013.01); *H04L 1/004* (2013.01); *H04L 1/20* (2013.01); *H04Q 11/0067* (2013.01); *H04Q 2011/0081* (2013.01)

(58) Field of Classification Search
CPC .............................. H04L 1/0003; H04L 1/004
See application file for complete search history.

(56) References Cited

U.S. PATENT DOCUMENTS

| | | | |
|---|---|---|---|
| 6,947,490 B1 * | 9/2005 | Edwards | H04L 1/0015 375/261 |
| 2005/0198272 A1 * | 9/2005 | Bernard | H04Q 11/0067 709/224 |
| 2010/0150245 A1 * | 6/2010 | Camp, Jr. | H04N 19/33 375/240.25 |
| 2016/0233979 A1 * | 8/2016 | Koike-Akino | H04L 1/0035 |
| 2023/0084999 A1 * | 3/2023 | Selvanesan | H04W 72/02 |

OTHER PUBLICATIONS

Tian et al., "Construction of Rate-Compatible LDPC Codes Utilizing Information Shortening and Parity Puncturing", EURASIP Journal on Wireless Communications and Networking, 2005 (Year: 2005).*

(Continued)

*Primary Examiner* — Shi K Li
(74) *Attorney, Agent, or Firm* — Josh C. Snider

(57) ABSTRACT

Adaptive modulation coding schemes improve spectral efficiency of telecommunication networks by implementing MCSs specific to each of a plurality of end devices in operable communication with a hub. For example, the MCSs may be specific to a channel, a wavelength, a distance, or capabilities of an end device. The MCSs are selected to include the highest modulation format and highest forward error correction coding rate that can be applied to a telecommunication signal without surpassing a signal parameter threshold.

22 Claims, 16 Drawing Sheets

(56) References Cited

OTHER PUBLICATIONS

Cho et al., "Normalized Generalized Mutual Information as a Forward Error Correction Threshold for Probabilistically Shaped QAM", IEEE, 2017 (Year: 2017).*
Gho et al., "Rate-Adaptive Modulation and Coding for Optical Fiber Transmission Systems", Journal of Lightwave Technology, vol. 30, No. 12, Jun. 2012 (Year: 2012).*
S. ten Brink, G. Kramer and A. Ashikhmin, "Design of low-density party-check codes for modulation and detection," IEEE Transactions on Communications, vol. 52, No. 4, pp. 670-678, Apr. 2004.
J. Bae, A. Abotabl, H. Lin, K. Song, and J. Lee, "An overview of channel coding for 5G NR cellular communications." APSIPA Transactions on Signal and Information Processing, vol. 8, E17, pp. 1-14, Oct. 2019.
Cable Television Laboratories, "Data-over-Cable Service Interface Specifications (DOCSIS) 3.1, Physical Layer Specifications," CM-SP-PHYv3.1-117-190917, Sep. 2019.
Xiaole Sun, Ding Zou, Zhen Qu, and Ivan B. Djordjevic, "Run-time reconfigurable adaptive LDPC coding for optical channels," OSA Opt. Express, vol. 26, No. 22, pp. 29319-29329, Oct. 2018.
A. Alvarado, T. Fehenberger, B. Chen, and F. M. J. Willems, "Achievable information rates for fiber optics: applications and computations," Journal of Lightwave Technology, vol. 36, No. 2, pp. 424-439, Jan. 2018.
Yequn Zhang, Ivan B. Djordjevic, "Staircase rate-adaptive LDPC-coded modulation for highspeed intelligent optical transmission" Proc. OFC 2014, paper M3A.6.
J. Zhang et al., Journal of Optical Communications and Networking, vol. 13, No. 2, "Efficient preamble design and digital signal processing in upstream burst-mode detection of 100G TDM coherent-PON," Feb. 2021, first published Dec. 2020.
International Telecommunication Union, ITU-T G.709.3, "Flexible OTN long-reach interfaces," Amendment 1, Jun. 2018.
International Telecommunication Union, ITU-T G.975.1, "Forward error correction for high bit-rate DWDM submarine systems," Feb. 2004.
Y. Zhang and I. B. Djordjevic, OFC 2014, paper M3A.6, "Staircase Rate-Adaptive LDPC-Coded Modulation for High-Speed Intelligent Optical Transmission," 2014.
X. Sun and I. B. Djordjevic, Optics Express, vol. 27, No. 3, "FPGA implementation of rate-adaptive spatially coupled LDPC codes suitable for optical communications, " Feb. 4, 2019.
X. Liu, et al., IEEE Commun. Lett., vol. 13, No. 12, An Efficient Dynamic Schedule for Layered Belief-Propagation Decoding of LDPC Codes, Dec. 2009.
International Telecommunication Union, ITU-T G.987.3, XG-PON: Transmission Convergence (TC) layer specification, Jan. 2014.
Lyubomirsky, I., IEEE P802.3cn Task Force Meeting, "OSNR link budget methodology," Nov. 12, 2018.
Chou, E.S. et al., "Adaptive coding and modulation for robust optical access networks," Journal of Lightwave Technology 38(8):2242-2252, Apr. 15, 2020.

* cited by examiner

ADAPTIVE MODULATION AND CODING SCHEMES FOR ENHANCED SPECTRAL EFFICIENCY

CROSS-REFERENCE TO RELATED APPLICATIONS

This application claims the benefit of and priority to U.S. Provisional Patent Application Nos. 63/117,734, filed Nov. 24, 2020, and 63/164,245, filed Mar. 22, 2021, each of which is hereby incorporated by reference in its entirety.

STATEMENT REGARDING FEDERALLY SPONSORED RESEARCH

None.

BACKGROUND

To support the increased number of users and growing demands in network bandwidth from 5G Xhaul, ultra-HD video streaming, and remote working/education/healthcare, optical broadband access based on passive optical networking (PON) is quickly evolving with a higher capacity, larger coverage, and deeper penetration. Among these access technologies, coherent PON (CPON) is emerging as a promising solution with a superior receiver sensitivity and longer transmission distance, making it possible to serve hundreds of homes with a single central equipment port. However, there are also many challenges in coherent PON development, and among them the design of forward-error-correction (FEC) coding is of great importance.

Compared with traditional PON based on intensity modulation and direct detection, coherent PON can provide a much larger optical distribution coverage with a large variance in fiber distance and number of passive splitters for the fiber nodes. This results in a significantly different channel condition and power budget for each passive node. If reusing the traditional fixed FEC approach, significant effort is required to balance the receiving performance between dense and sparse (e.g., urban and rural) areas, resulting in inefficient use of network resources and limited flexibility.

Recently, progress has been made in FEC development in 5G and next-generation optical transport networks (OTN). High performance concatenated/iterative FEC schemes have been standardized in ITU-T G.709.3 flexible OTN and ITU-T G.975 submarine systems. Among the FEC schemes, the soft-decision low-density parity-check (LDPC) codes draw attention since 5G New Radio (5G-NR) adopts them to encode user data with variable rates to match different channel conditions. Other than in wireless standards like IEEE 802.11n and 5G-NR, LDPC is also widely used in DOCSIS 3.1 downstream and upstream. In these technologies, different lengths of code words are introduced to cover different grant sizes in upstream transmission and code-word shortening is enabled to achieve strong burst noise protections.

However, in coherent optical fiber networks, a higher noise floor is present due to amplified spontaneous emission (ASE) inside erbium-doped fiber amplifiers. In addition, the laser linewidth is typically much wider than the electrical counterparts, which corresponds to higher phase noise values. Thus, high-speed coherent optical systems are dominated by single carrier modulation and blind algorithms for synchronization, equalization, carrier recovery, and soft decision.

SUMMARY

Devices, software, and methods disclosed herein use adaptive modulation coding schemes (MCSs) to improve spectral efficiency of telecommunication networks by implementing MCSs specific to each of a plurality of end devices in operable communication with a hub. For example, the MCSs may be specific to a channel, a wavelength, a distance, or capabilities of an end device. The MCSs are selected to include the highest modulation format and highest forward error correction coding rate that can be applied to a telecommunication signal without surpassing a signal parameter threshold.

In an aspect, a method for improving spectral efficiency of a telecommunication network based on use of modulation coding schemes specific to each of a plurality of end devices in operable communication with a hub comprises: selecting a first MCS for a first telecommunication signal to be exchanged between a hub and a first end device, the first MCS comprising a highest modulation format from a set of modulation formats and a highest forward error correction (FEC) coding rate from a set of FEC coding rates that do not surpass a signal parameter threshold; selecting a second MCS for a second telecommunication signal to be exchanged between the hub and a second end device, the second MCS comprising a highest modulation format from the set of modulation formats and a highest FEC coding rate from the set of FEC coding rates that do not surpass the signal parameter threshold; and applying the first MCS to the first telecommunication signal and the second MCS to the second telecommunication signal.

In an embodiment, the highest modulation format and the highest FEC coding rate of the first MCS and the second MCS are different. In an embodiment, only the highest modulation formats of the first MCS and the second MCS are different. In an embodiment, only the highest FEC coding rates of the first MCS and the second MCS are different. In an embodiment, the first MCS and the second MCS are identical. Exemplary modulation formats within the set of modulation formats include but are not limited to QPSK, 4-QAM, 8-QAM, 16-QAM, 64-QAM and 256-QAM. Exemplary FEC coding rates within the set of FEC coding rates, include but are not limited to ½, ⅔, ¾, ⅘, ⅚, ⅞, and ¹¹⁄₁₂. In an embodiment, the highest modulation format is distance dependent.

In an embodiment, the plurality of end devices comprises N end devices, where N is an integer greater than or equal to 2, and each of the end devices is assigned an MCS with the highest modulation format and FEC coding rate that does not surpass a signal parameter threshold. For example, a processor or scheduler within the hub may assign an MCS to each end device such that the spectral efficiency of the entire telecommunication network is improved relative to using one MCS and/or one FEC coding rate for all telecommunication signals.

In an embodiment, the signal parameter is selected from the group consisting of generalized mutual information (GMI), normalized generalized mutual information (NGMI), bit error rate (BER), signal-to-noise ratio (SNR), signal-to-interference-noise ratio (SINR), optical signal-to-noise ratio (OSNR), power level, error vector magnitude (EVM) and combinations thereof. Typically, the threshold of the signal parameter is selected to meet an error-free operation criterion. In an embodiment, the GMI or the NGMI is specific to a channel, a wavelength, a distance, or an end device.

In an embodiment, subcarriers at edges of a wavelength band utilize a different MCS than a channel at a center of the wavelength band.

In an embodiment, a forward error correction (FEC) code is a Hamming code, a low-density parity check (LDPC), or a Reed-Solomon code. In some embodiments, an LDPC is subjected to information shortening or parity puncturing.

In an embodiment, one or both of the first telecommunication signal and the second telecommunication signal are downlink signals. In an embodiment, at least one of the first telecommunication signal and the second telecommunication signal is an uplink signal. In an embodiment, both of the first telecommunication signal and the second telecommunication signal are uplink signals. For example, a processor or scheduler within a hub may instruct an end device to use a selected MCS for uplink transmissions through in-band or out-of-band messaging.

In an aspect, a telecommunication network comprises a hub in operable communication with a plurality of end devices and a processor within the hub configured to select a first modulation coding scheme (MCS) for a first telecommunication signal to be exchanged between the hub and a first end device of the plurality of end devices, the first MCS comprising a highest modulation format from a set of modulation formats and a highest forward error correction (FEC) coding rate from a set of FEC coding rates that when used together do not surpass a signal parameter threshold; select a second MCS for a second telecommunication signal to be exchanged between the hub and a second end device of the plurality of end devices, the second MCS comprising a highest modulation format from the set of modulation formats and a highest FEC coding rate from the set of FEC coding rates that when used together do not surpass the signal parameter threshold; and provide instructions for the first MCS to be applied to the first telecommunication signal and for the second MCS to be applied to the second telecommunication signal.

In an embodiment, a telecommunication network is a hybrid fiber coaxial (HFC) network, a satellite network, a wireless network, a fiber optic network, a passive optical network (PON), a coherent passive optical network (CPON), or a free-space optical network.

In an embodiment, a hub is an optical line terminal (OLT), a Modem Termination System (MTS), a Cable Modem Termination System (CMTS), a mobile core, an evolved packet core, or a converged cable access platform (CCAP) core.

In an embodiment, an end device is a base station, a node, an optical network unit (ONU), a modem, a gateway, user equipment, a remote radio head, a remote-PHY device, or a remote MAC-PHY device.

In an embodiment, telecommunication signals are transmitted on a transmission medium selected from the group consisting of a coaxial cable, a hybrid fiber coaxial cable, an optical fiber, or a designated wavelength.

In an aspect, a non-transitory computer-readable medium has a plurality of non-transitory instructions executable with a processor for improving spectral efficiency of a telecommunication network based on use of modulation coding schemes (MCSs) specific to each of a plurality of end devices in operable communication with a hub, the plurality of non-transitory instructions being executable for: selecting a first MCS for a first telecommunication signal to be exchanged between a hub and a first end device, the first MCS comprising a highest modulation format from a set of modulation formats and a highest forward error correction (FEC) coding rate from a set of FEC coding rates that do not surpass a signal parameter threshold; selecting a second MCS for a second telecommunication signal to be exchanged between the hub and a second end device, the second MCS comprising a highest modulation format from the set of modulation formats and a highest FEC coding rate from the set of FEC coding rates that do not surpass the signal parameter threshold; and applying the first MCS to the first telecommunication signal and the second MCS to the second telecommunication signal.

BRIEF DESCRIPTION OF THE DRAWINGS

Illustrative embodiments of the present invention are described in detail below with reference to the attached drawings.

DETAILED DESCRIPTION

Figure 1A:
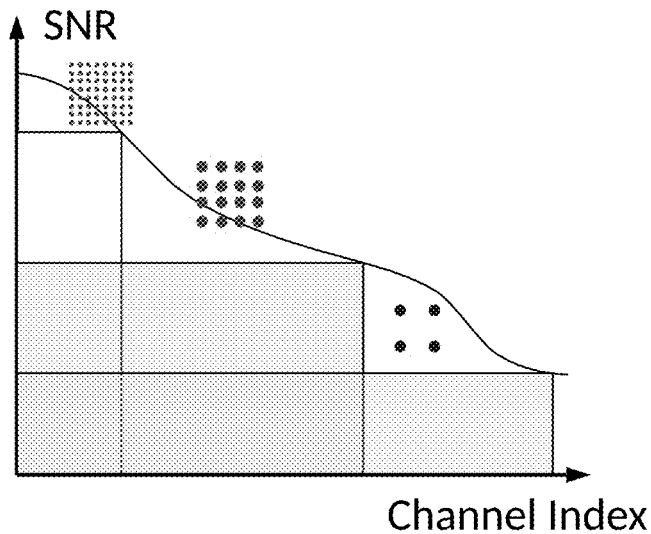
FIGS. 1A, 1B, and 1C. Comparisons between modulation loading without and with FEC.

In general, the terms and phrases used herein have their art-recognized meaning, which can be found by reference to standard texts, journal references and contexts known to those skilled in the art. The following definitions are provided to clarify their specific use in the context of this description.

As used herein, the term "network" refers generally to any type of telecommunications or data network including, without limitation, hybrid fiber coaxial (HFC) networks, satellite networks, telco networks, and data networks (including MANs, WANS, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A, WAP, SIP, UDP, FTP, RTP/RTCP, H.323, etc.).

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, "modulation format" refers to a set of mapping relationships between symbols and binary information, which may form a constellation diagram, for encoding digital or electrical signals. The size of the set determines the number of binary code symbols that can be represented by each symbol, but a larger sets requires the points of the constellation diagram to be closer together and more susceptible to noise. Thus, higher-order modulation formats can deliver more information less reliably (i.e., with a higher bit error rate), unless the signal-to-noise ratio is increased by increasing signal energy, reducing noise, or both.

As used herein, "forward error correction (FEC) code" refers to a coding scheme that allows a receiver to re-create a portion of missing data from the coding redundancy without having to request re-transmission.

A "forward error correction (FEC) coding rate" is the proportion of the data stream that is useful (non-redundant). The FEC coding rate determines the amount of information represented by each symbol, with a higher coding rate corresponding to higher information per bit.

As used herein, a "modulation coding scheme (MCS)" comprises a modulation format and a FEC coding scheme, which enables each symbol to carry a tunable number of information bits. In some embodiments, each symbol carries a non-integer number of information bits.

As used herein, the "mutual information" of two random variables is a measure of the mutual dependence between the two variables. The parameter quantifies the amount of information obtained about one variable from an observation of the other variable.

Figure 1B:
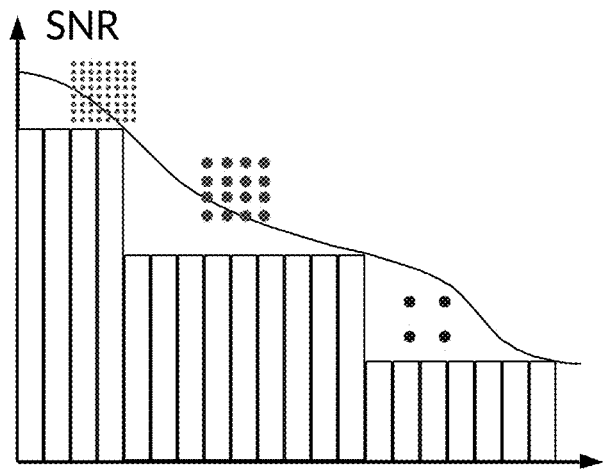
Figure 1C:
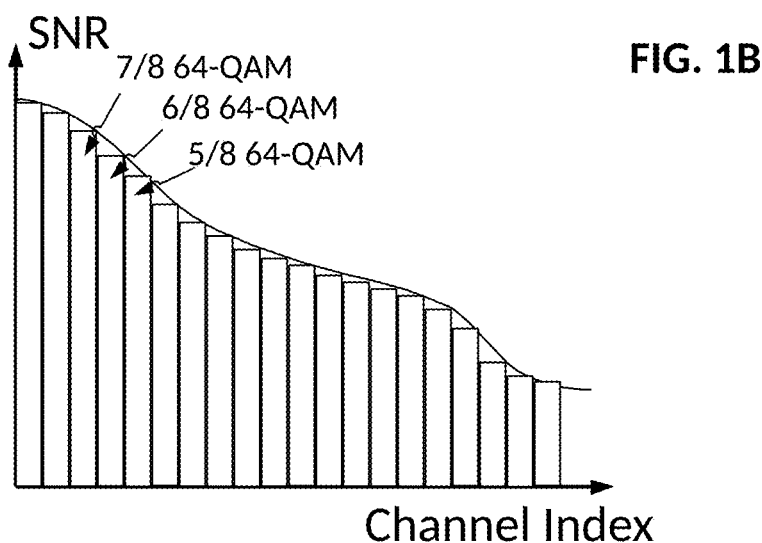

As shown in FIG. 1A, large dynamic range, high-order modulation formats could only use a small portion of the channel and low-order modulation formats could waste a lot of spectral efficiency. Improvement may be achieved by a modulation format with a non-integer QAM order, which can be achieved by a coded QAM signal with a certain coding rate as shown in FIG. 1B. On the other hand, it is well known that, there are some limitations if the link adaptation is only realized by upgrading or downgrading the modulation orders. For square distributed constellations, between $2^{2N}$-QAM to $2^{2(N+1)}$-QAM, there will be a 6-dB SNR penalty, which results in wasting unused system margins. However, jointly adjusting modulation format and FEC with different coding rates and applying the capacity-maxima coding rate for each channel, better utilizes the system margin as shown in FIG. 1C, and the overall spectral efficiency can also be greatly improved.

Figure 2:
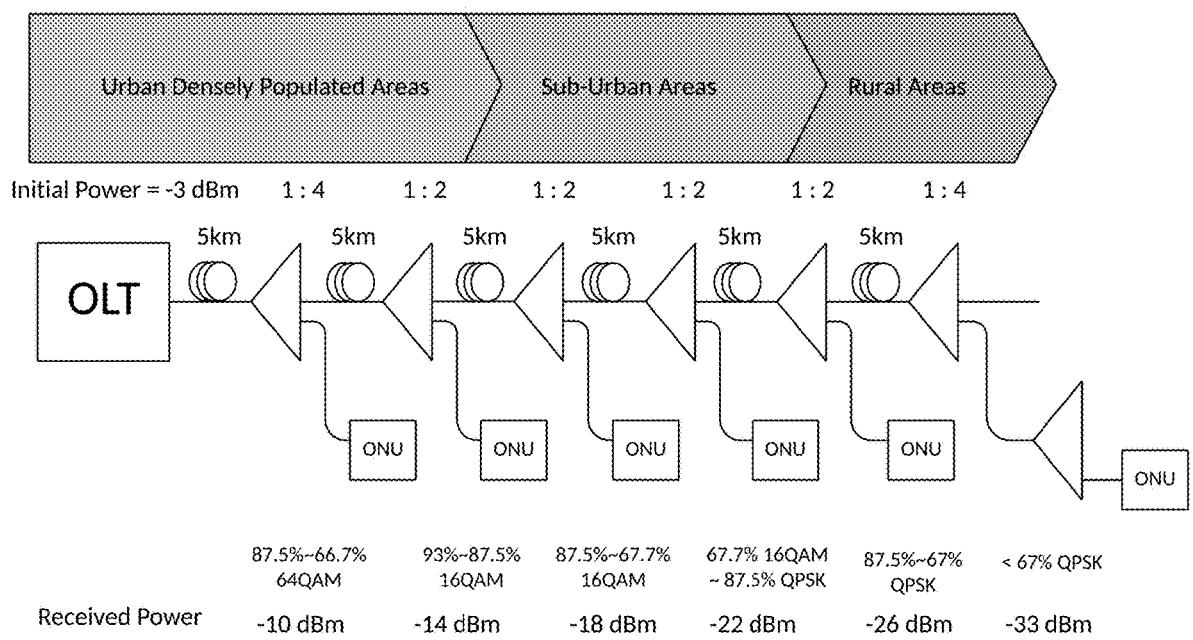
FIG. 2 illustrates use of adaptive error-correction coding rates in CPON, according to an embodiment.

A potential scenario of using adaptive FEC rates in CPON is shown in FIG. 2. Since the CPON coverage is increased, one single optical line terminal (OLT) would support the whole metro area from urban densely populated areas, sub-urban areas, to the rural areas. In the downtown urban area, high population density is expected with extremely high bandwidth demand. However, in the rural areas, the user density and capacity demands are reduced, and the transmission distance is relatively long which also degrades the channel qualities. To optimize power consumption and infrastructure building costs, it is possible to deliver a higher throughput with high-order modulation format and high coding rates to the urban areas, where the fiber nodes are relatively closer to the OLT, and lower-order modulation format and lower coding rates to the rural areas. It is worth noting, however, that a higher coding rate also performs better to compensate for the more severe channel penalties.

LDPC with Variable Coding Rates

Figure 3A:
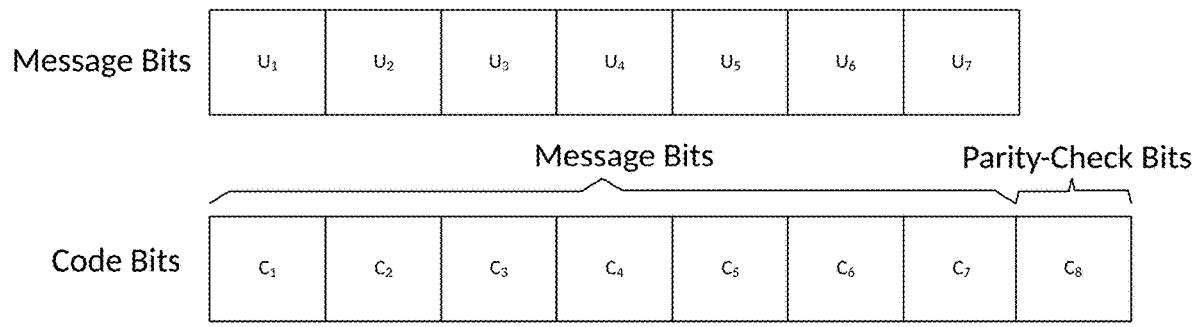
FIG. 3A illustrates data structure after LDPC encoding.
Figure 3B:
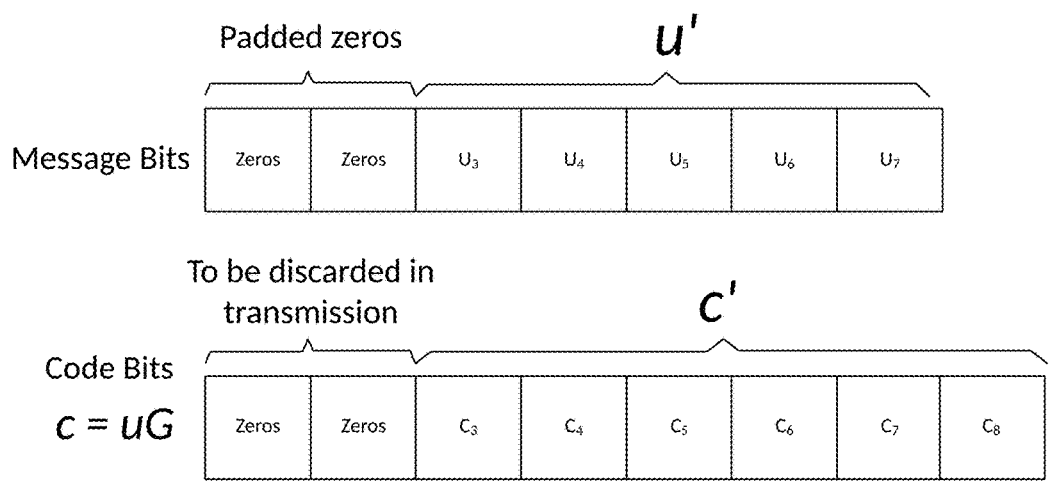
FIG. 3B illustrates procedures for information shortening.

After LDPC encoding, a typical data code word structure is shown in FIG. 3A, which includes the information bits and parity-check bits. Given a mother parity-check matrix, there are two approaches to achieve variable coding rates based on it. The first approach is information shortening, as shown in FIG. 3B, where part of the information bits sent will be padded as zeros instead of payload data. Before transmission, these zeros will be discarded and at the receiver side, they will be added to each code word again before decoding. Since these zeros will not be transmitted, the size of the information bits is actually shortened and the overhead percentage of the parity-check bits is increased, which reduces the effective coding rate of LDPC. On the contrary, the effective coding rate of LDPC can also be increased through parity puncturing. In parity puncturing, there is no modification to the information bits, but some of the parity-check bits will be truncated and discarded after the encoding process. At the receiver side, after soft decisioning, the log-likelihood-ratios (LLR) of these discarded parity-check bits will be initiated as 0. Through parity puncturing, the percentage of the parity-check overhead is reduced during transmission, which increases the effective coding rate at the expense of weakening error correction performance. In both information shortening and parity puncturing, the same mother parity-check matrix is shared by the encoders and decoders. There is no need to generate a new parity-check matrix, which saves memory resources and reduces computational complexity.

Figure 4A:
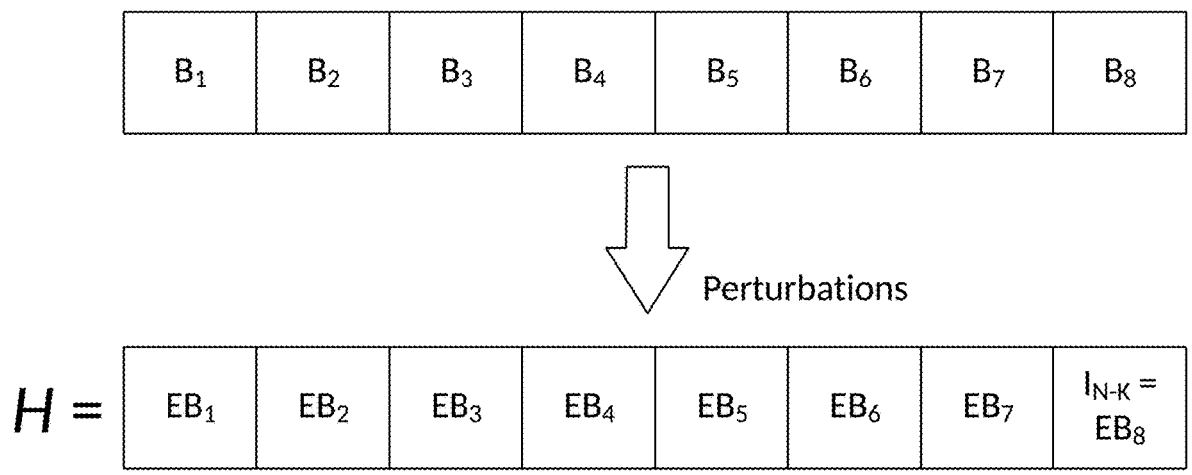
FIG. 4A shows the structure of a parity-check matrix.
Figure 4B:
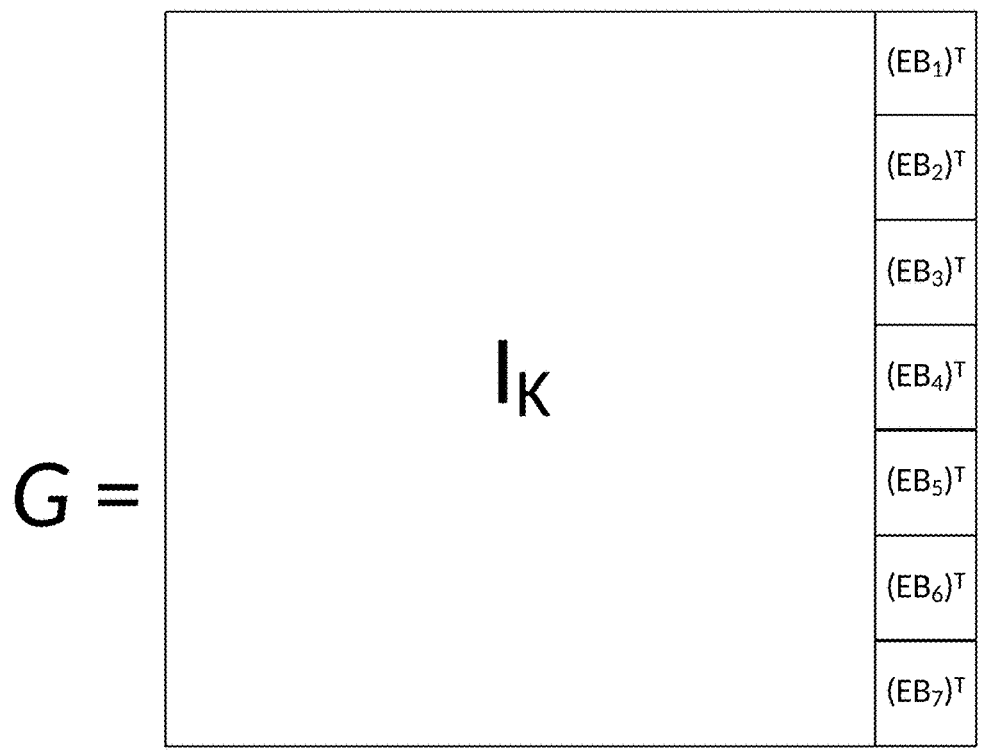
FIG. 4B illustrate a generation matrix.

The parity-check and generation matrix of the LDPC code used herein is shown in FIGS. 4A and 4B. The mother parity-check matrix H is constructed by a Mackay-Neal pseudo random method. It contains eight blocks with a total size of N×(N−K)=16384×2048, where N and K are the sizes of the codeword bits and message bits respectively. For ease in calculating the generation matrix, perturbations are performed to convert the last block of H into a (N−K) by (N−K) unit matrix, as shown in FIG. 4A. Then, generation matrix G can be immediately obtained in the form shown in FIG. 4B. Given the array of message bits, u, and coding bits, c, the encoding is accomplished by multiplying u with the generation matrix as c=uG. The shortening process is shown in FIG. 3B. Before encoding, some zeros are added at the beginning of the message bits. Then after encoding, these zeros are discarded without transmission. Assuming the size of padded zeroes is $K_z$, after shortening, the effective coding rate is reduced from (N−K)/N to (N−K−$K_N$)/(N−$K_Z$). From FIGS. 3A, 3B, 4A and 4B, it can be concluded that information shortening is a relatively simpler method to alter the coding rate without replacing the whole parity-check matrix and without changing the decoding or encoding algorithms. Thus, it is an efficient method to save memory resource usage and reduce the complexity in hardware design to flexibly adapt the coding rate with a large range.

Figure 5A:
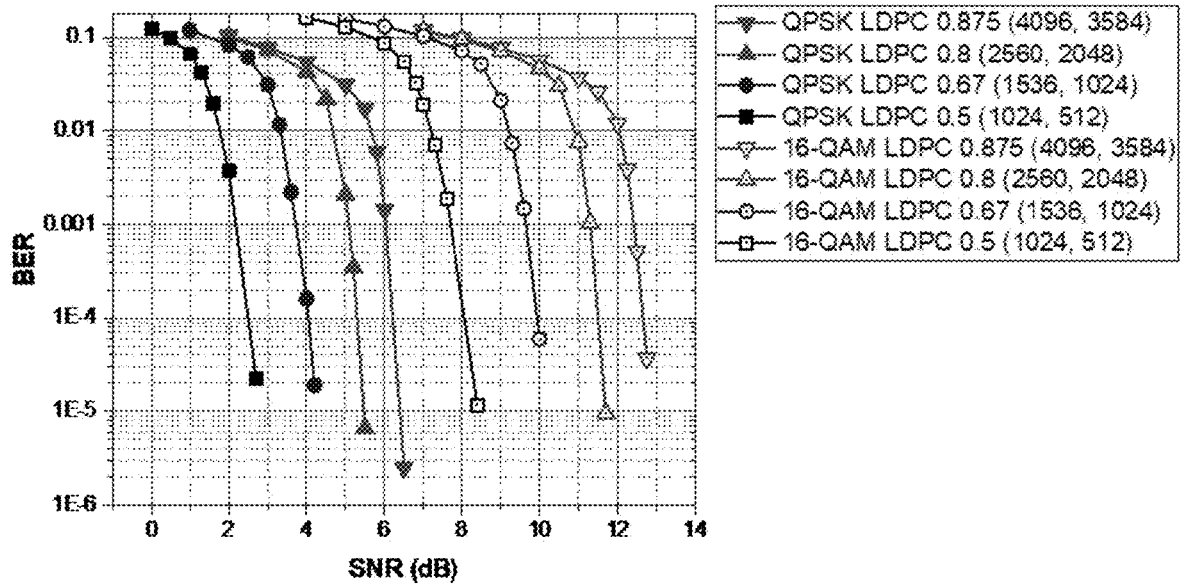
FIGS. 5A, 5B, and 5C plot BER versus SNR for different coded modulation formats.
Figure 5B:
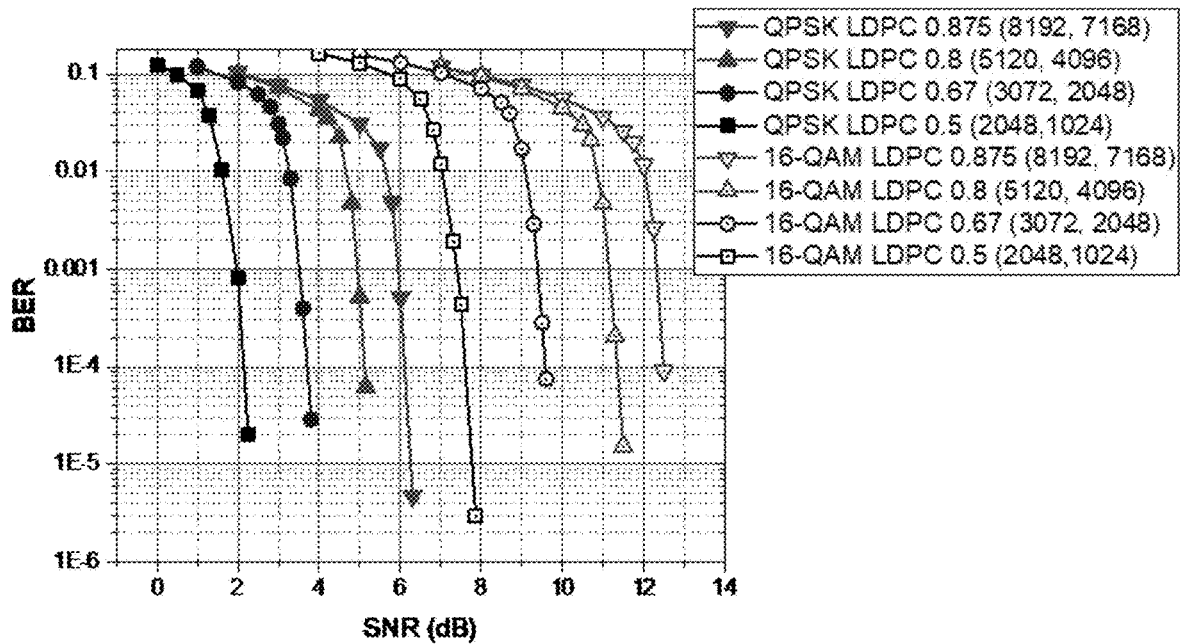
Figure 5C:
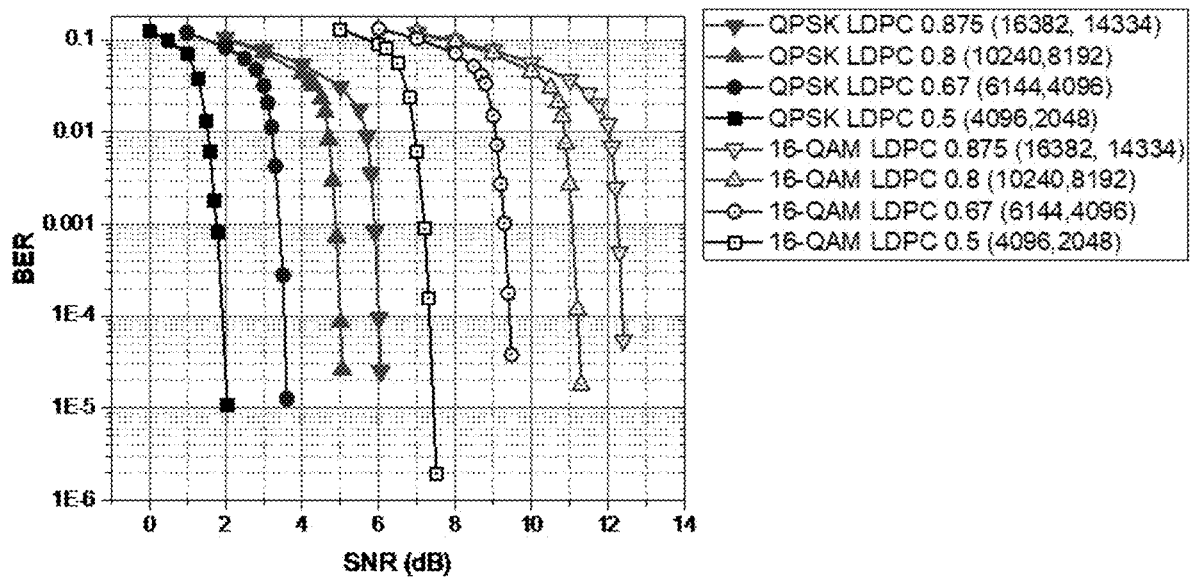

Setting N/K=8, with the shortening length varied from 0, K, 3K, 5K, and 6K, the coding rate is tuned to 87.5%, 80%, 67%, and 50%, respectively. The error correcting performance of the LDPC codes when (N, N−K)=(4096, 3584), (8192, 7168), and (16382, 14344) were evaluated. Two modulation formats including QPSK and 16-QAM were tested. The simulation results of bit error rate (BER) versus input signal's SNR under soft decision is shown in FIGS. 5A, 5B and 5C. It is observed that, with varying the coding rate and modulation format, the performance of the FEC can be continuously adjusted with evenly distributed thresholds over the SNR. When the size of the parity-check matrix increases, the performance of the LDPC codes under the same coding rate is improved with a lower SNR threshold. On the other hand, as a statistical channel quality indicator, SNR shows limitations in some cases. First, the SNR is based on a relatively simple channel model and, in terms of nonlinear distortions and inter-channel interference, it is not accurate enough. Second, the SNR cannot predict the FEC precise thresholds because BER-versus-SNR curves may overlap with different combinations of FEC coding rates and modulation formats. Thus, using SNR as the threshold may not be sufficient to differentiate the FEC coding at different rates. To avoid these issues, normalized generalized mutual information (NGMI) is a useful statistical channel-quality indicator. Given N (I=1:N) uniform M-QAM (i=1:M and j=1:M) symbols under arbitrary white Gaussian noise (AWGN) channel, the received symbol set can be written as Y=X+Z, where X is the original symbol set and Z is the set of noise plus interference. x, y, and z are the specific elements in X, Y and Z respectively. The mutual information can be calculated as $$MI \approx \log 2(M) - \frac{1}{MN} \sum_{l=1}^{N} \sum_{i=1}^{M} \log_2 \left( \sum_{j=1}^{M} \exp\{-\rho(|w_i - w_j|^2 + 2\mathcal{R}[(w_i - w_j)^* z_l])\} \right), \quad (1)$$

where $\rho=E_X(|X|^2)/E(|Z|^2)$ is the signal-to-interference-plus-noise ratio (SINR), $w_i$ and $w_j$ are the $i^{th}$ and $j^{th}$ complex element from the standard M-QAM constellation points (for example 1+1j and −1+1j), and z is the $l^{th}$ noise element from the set Z. The general mutual information can be calculated as $$GMI \approx \log_2(M) - \frac{1}{N} \sum_{l=1}^{N} \sum_{k=1}^{m} \log_2(1 + \exp[1 + \exp[(-1)^{c_l} \pi \lambda_{k,l}]]), \quad (2)$$

where $$\lambda_{k,l} = \log \frac{\sum_{x \in x_k^1} \exp(-\rho|y_l - x|^2)}{\sum_{x \in x_k^0} \exp(-\rho|y_l - x|^2)}$$

is the LLR of the received symbol, m=log 2(M), and $c_l$ is the digital value represented by the $l^{th}$ element in X (for example −1+1j, 1+1j, 1−1j, and −1−1j in QPSK represents 0, 1, 2, and 3, respectively). Then the NGMI can be calculated as $$NGMI = \frac{GMI}{m}. \quad (3)$$

It is worth noticing that NGMI yields almost identical post-FEC BER for a given coding scheme under the same coding rate, independent of modulation format. As a ratio of number of information bits per transmission bits, NGMI provides a good estimation of the theoretical upper bound of error-free FEC coding rates. Given NGMI of a channel, it can be inferred that an ideal binary FEC code exists with a rate R=NGMI to produce error-free post-FEC results. However, considering practical scenarios, a small gap Δ is reserved from the theoretical limit as R+Δ=NGMI.

Figure 6A:
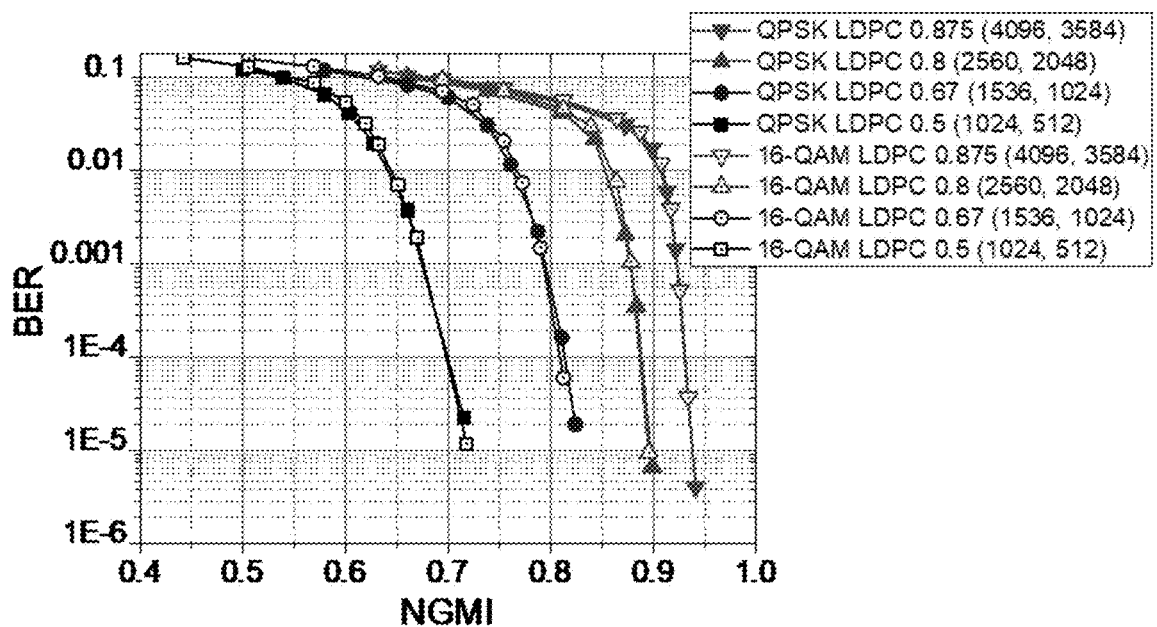
FIGS. 6A, 6B, and 6C plot BER versus NGMI for different coded modulation formats.
Figure 6B:
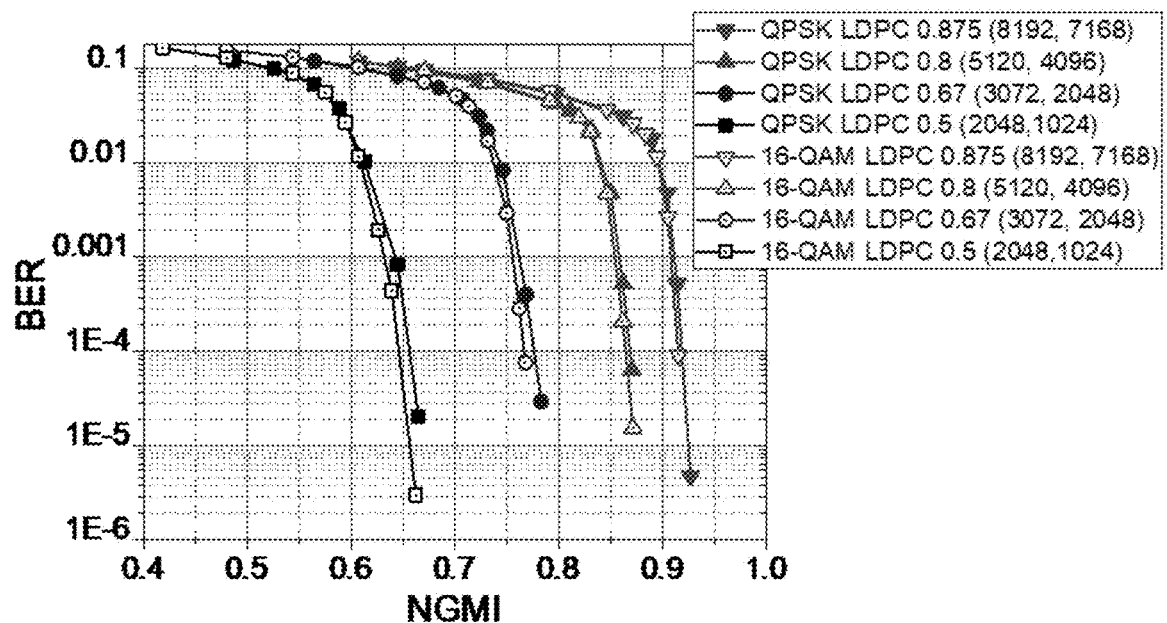
Figure 6C:
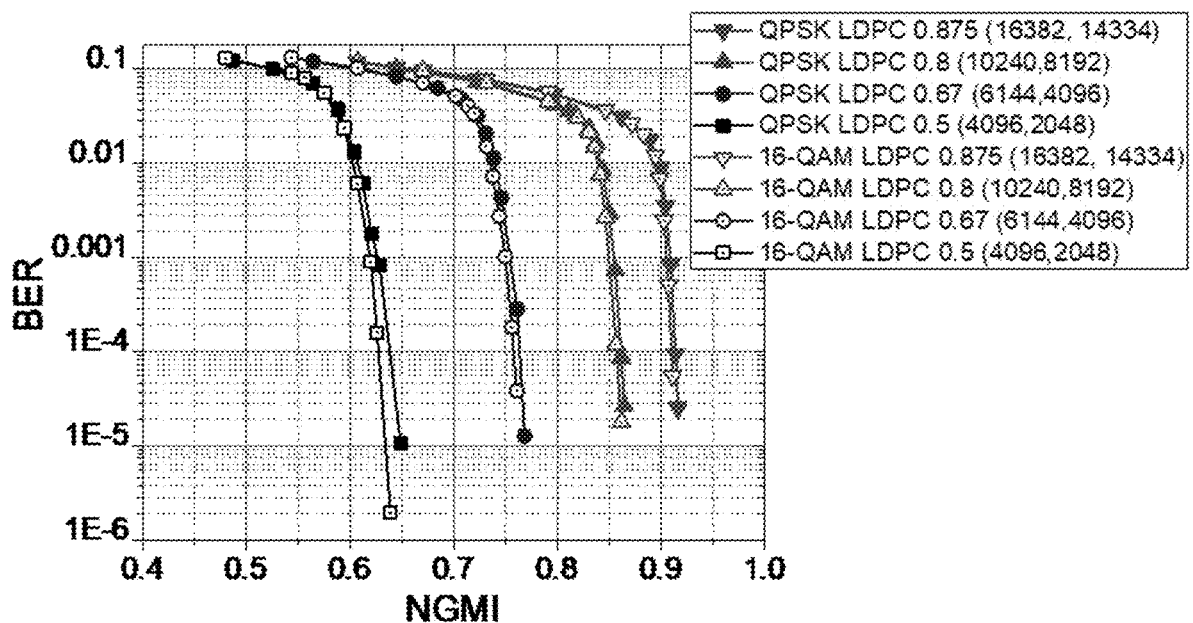

The BER performance of the LDPC coded modulation versus NGMI is shown in FIGS. 6A, 6B and 6C under different modulation formats and FEC coding rates. It can be observed that with increasing the size of the parity-check matrix, the curves become steeper and the BER thresholds are improved, which tends to be approaching the NGMI, especially at the higher coding rates. On the other hand, it is also noticed that, when measuring using NGMI, under the same parity-check matrix size and coding rate, the performance of the LDPC codes does not vary when a different modulation format is used. This property indicates that NGMI could be an unbiased performance indicator in terms of different modulation formats. The thresholds provided by NGMI remain stable across a wide range of QAM formats.

Coded Modulation with FEC Adaptation

It is expected that in future CPON networks, with increased receiver sensitivity and DSP for mitigating fiber chromatic dispersion, the network coverage and the number of connected users will be greatly increased. Multiple stages of fiber splitters may be introduced in the network. The distances and number of splitters from the fiber nodes toward the hub will differ, which brings a significant variation of the transmission loss and channel quality. If CPON relies on traditional schemes to provide uniform FEC and modulation format to different fiber nodes, a lot of system margin may be wasted for the users with shorter transmission distance and the quality of service may be seriously degraded for rural users. Thus, a distribution mechanism to load different FEC coded modulation to different fiber nodes according to their unique channel status would be a promising solution to fully utilize the bandwidth resources and guarantee the overall quality of service.

Example 1

Figure 7A:
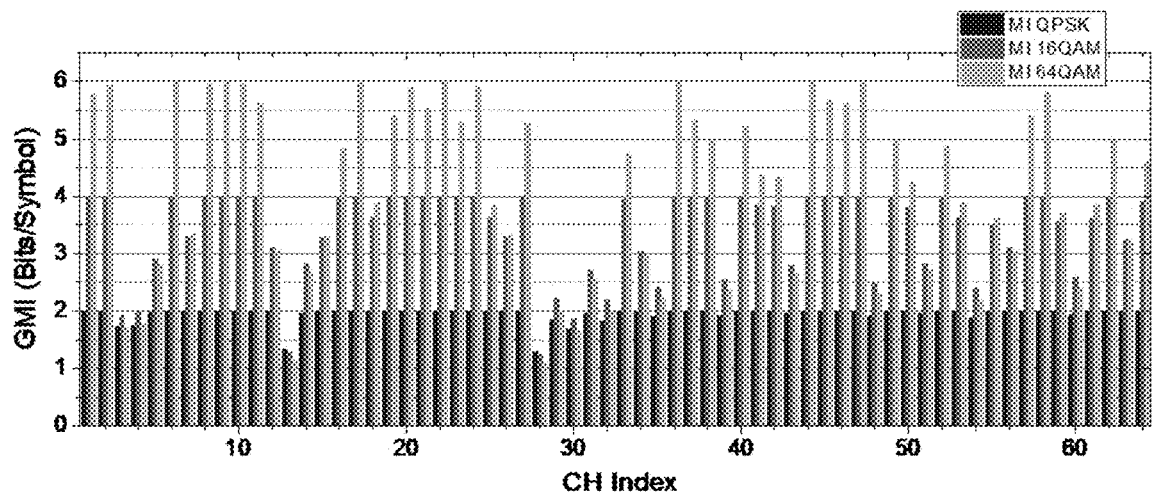
FIG. 7A shows GMI distributions for all the channels in a CPON.
Figure 7B:
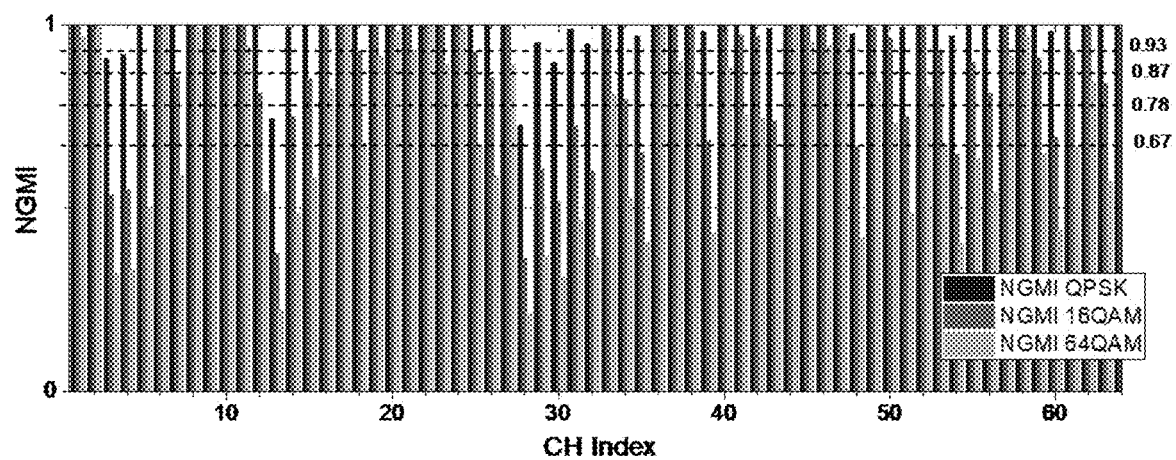
FIG. 7B shows NGMI distributions for all the channels in a CPON.
Figure 8:
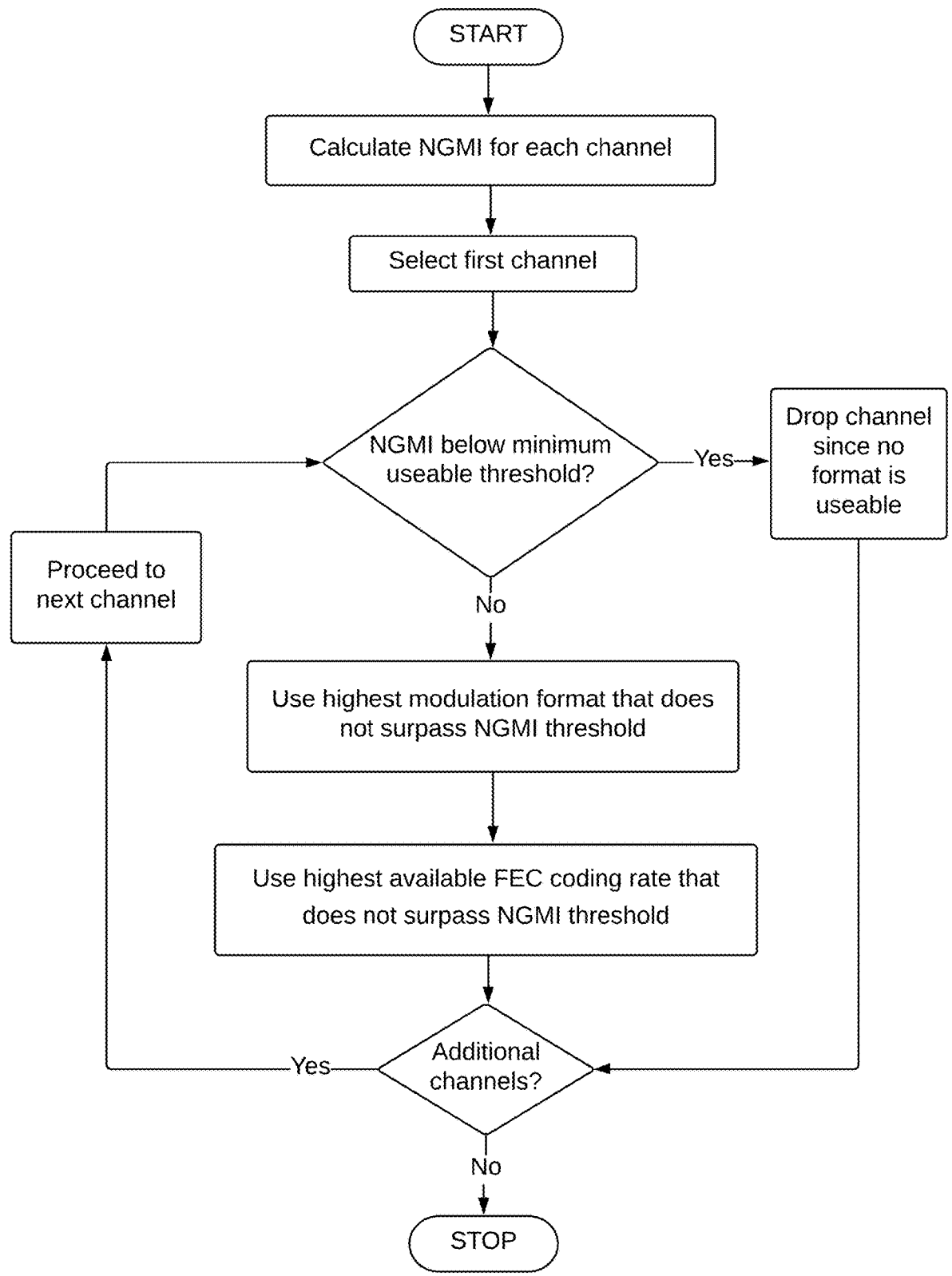
FIG. 8 is a flowchart illustrating steps in a method for improving spectral efficiency of a telecommunication network based on use of modulation coding schemes (MCSs) specific to each of a plurality of channels in operable communication with a hub, according to an embodiment.

In the following simulation process, supposing a CPON network connecting 64 fiber nodes to 1 hub. The fiber transmission distances are varied from 5 to 80 km with three stages of fiber splitters. Based on these conditions, 64 channels with random transmission losses are generated. The modulated symbol rate for all the channels is supposed to be 32 GBaud. The calculated distributions for the GMI and NGMI of these channels are plotted in FIGS. 7A and 7B respectively. In the system, 9 coded modulation formats will be considered. Their effective information bits per symbol are listed in Table I. The procedures to load a variety of coded modulation formats to each channel is shown in FIG. 8. In this algorithm, the first step is to calculate the NGMI for each channel under the modulation of dual-polarization-QPSK (DP-QPSK), DP-16-QAM, and DP-64-QAM at 32 GBaud. Then, starting from the first channel until the last one, the algorithm will fit the channel with the best modulation format based on the NGMI threshold. If the channel condition is insufficient to support 50% DP-QPSK, the algorithm will be terminated, and the channel is dropped from carrying data. Then sweeping from 50% DP-QPSK to 87.5% DP-64-QAM, the system will allocate the modulation format to maximize the data rate, when the channel NGMI could pass the corresponding threshold and a certain amount of margin is preserved to guarantee error-free performance.

FIG. 8 exemplifies a method for improving spectral efficiency of a telecommunication network based on use of modulation coding schemes (MCSs) specific to each of a plurality of channels in operable communication with a hub. The illustrated method is for the signal parameter of NMGI per channel. However, other parameters and implementations may be substituted into the disclosed method.

TABLE I

Coded Modulation Formats

| Modulation Format | FEC Coding Rate | Codeword Size | Message Size | Effective Bits per Symbol |
|---|---|---|---|---|
| DP-QPSK | 50% | 4096 | 2048 | 2 |
| DP-QPSK | 67% | 6144 | 4096 | 2.68 |
| DP-QPSK | 80% | 10240 | 8192 | 3.2 |
| DP-QPSK | 87.5% | 16382 | 14334 | 3.5 |
| DP-16-QAM | 50% | 4096 | 2048 | 4 |
| DP-16-QAM | 67% | 6144 | 4096 | 5.36 |
| DP-16-QAM | 80% | 10240 | 8192 | 6.4 |
| DP-16-QAM | 87.5% | 16382 | 14334 | 7 |
| DP-64-QAM | 67% | 6144 | 4096 | 8 |
| DP-64-QAM | 80% | 10240 | 8192 | 9.6 |
| DP-64-QAM | 87.5% | 16382 | 14334 | 10.5 |

Figure 9A:
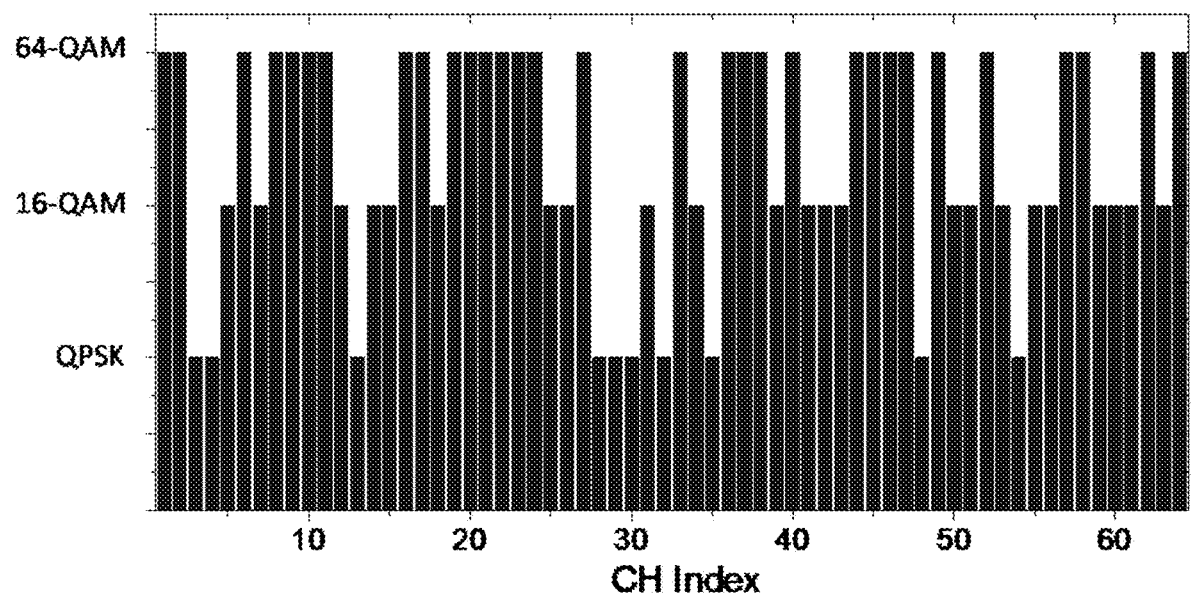
FIG. 9A shows allocated modulation formats for each channel.
Figure 9B:
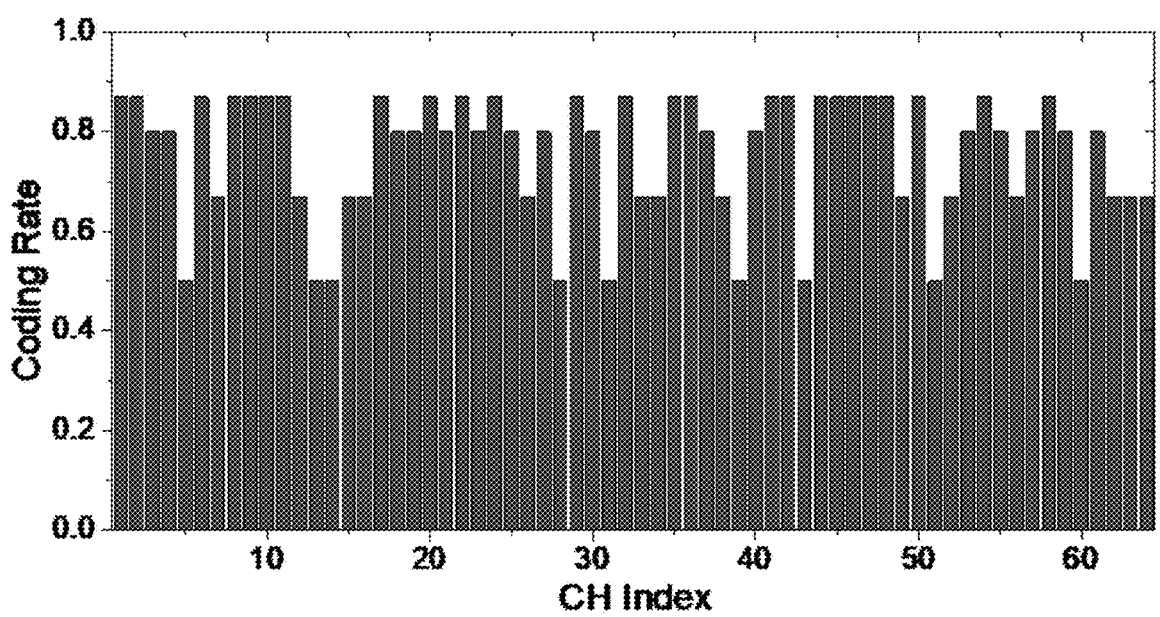
FIG. 9B shows allocated FEC coding rates for each channel.
Figure 10A:
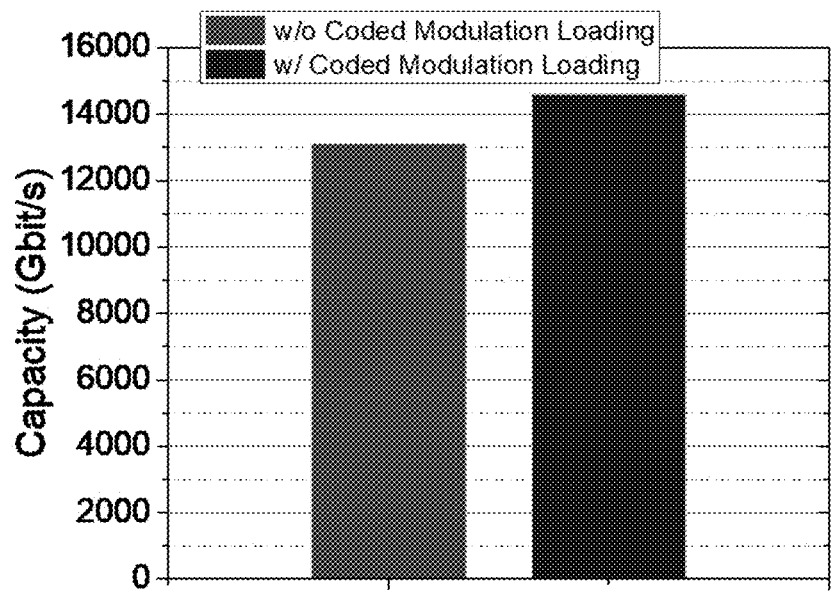
FIG. 10A shows network capacity with and without coded modulation loading, according to an embodiment.
Figure 10B:
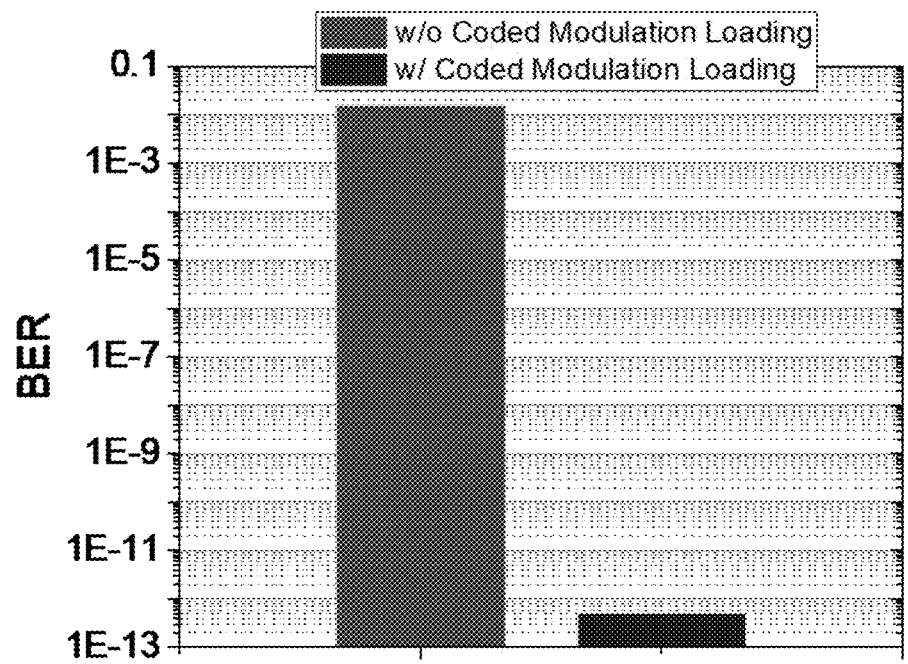
FIG. 10B shows average BER per channel with and without coded modulation loading, according to an embodiment.

The simulation results for the allocated QAM orders and FEC coding rates after performing the coded modulation adaptation for the whole 64 channels are shown in FIGS. 9A and 9B, respectively. The system performances of overall network capacity and average BER per channel have been compared with and without applying the proposed coded modulation adaptation, as shown in FIG. 10. When without coded modulation adaptation, 32-GBaud DP-16-QAM is applied for all the channels with an FEC coding rate of 80%. Under this condition, when adaptive coded modulation is applied, the system total capacity can be improved from 13.107 Tbit/s to 14.616 Tbit/s. The average post-FEC BER for each channel is significantly reduced from 1.61E-2 to less than 1E-12. It is observed that, thanks to the ability to select the best fitted coded modulation format according to the specific channel conditions, the proposed coded modulation adaptation scheme can not only maximize the total system capacity but also greatly improve the signal's transmission quality.

Conclusion

Here, we proposed to use adaptive coded modulation in a CPON system to increase the total capacity and improve the quality of service for each connected fiber node. NGMI was used as the channel quality indicator because of its high accuracy and stability under different modulation formats. A set of methods to accomplish the coded modulation adaptation has also been developed. The methods could optimize the coded modulation format allocation according to the channel conditions of different fiber nodes. Increased overall network capacity and significant signal quality improvements have been achieved.

REFERENCES

[1]. S. ten Brink, G. Kramer and A. Ashikhmin, "Design of low-density parity-check codes for modulation and detection," IEEE Transactions on Communications, vol. 52, no. 4, pp. 670-678, April 2004.

[2]. J. Bae, A. Abotabl, H. Lin, K. Song, and J. Lee, "An overview of channel coding for 5G NR cellular communications." APSIPA Transactions on Signal and Information Processing, vol. 8, E17, pp. 1-14, October 2019.

[3]. Cable Television Laboratories, Data-over-Cable Service Interface Specifications (DOCSIS) 3.1, Physical Layer Specifications, CM-SP-PHYv3.1-117-190917, September 2019.

[4]. Xiaole Sun, Ding Zou, Zhen Qu, and Ivan B. Djordjevic, "Run-time reconfigurable adaptive LDPC coding for optical channels," OSA Opt. Express, vol. 26, no. 22, pp. 29319-29329, October 2018.

[5]. A. Alvarado, T. Fehenberger, B. Chen, and F. M. J. Willems, "Achievable information rates for fiber optics:

applications and computations," Journal of Lightwave Technology, vol. 36, no. 2, pp. 424-439, January 2018.

[6]. Yequn Zhang, Ivan B. Djordjevic, "Staircase rate-adaptive LDPC-coded modulation for highspeed intelligent optical transmission" Proc. OFC 2014, paper M3A.6.

Example 2

An adaptive coded-modulation approach combining QAM and shortened LDPC is disclosed for a coherent-PON architecture. The BER performance was experimentally verified and network simulations using operator data indicated an average 40.2% increased capacity and 47.6% improved coverage.

Coded modulation with adaptive FEC in coherent PON fully exploits the advantages of high data rate and link budget to connect hundreds of fiber nodes or optical termination points from urban to rural areas with a large variation in fiber transmission length and split ratios. The adaptive FEC is realized by information shortening or parity puncturing in LDPC code, which is computationally efficient and cost effective since encoder and decoder can reuse the same parity check matrix at different coding rates. Twelve modulation-and-coding-scheme (MCS) options running at 32GBd with four coding rates were implemented to cover various channel conditions (Table 2). The thresholds in optical signal to noise ratio (OSNR) of all the MCS were experimentally measured. Simulations and modeling were performed on real network topology data from a network operator in the United States. The results demonstrate that compared with a fixed MCS, the network capacity and coverage can be increased by up-to 94.9% and 146.0%, which indicates the effectiveness of using adaptive MCS in coherent-PON systems.

TABLE 2

Specifications of different modulation-and-coding-scheme (MCS) options.

| Option | MCS | Rate | Bit/Symbol |
|---|---|---|---|
| 1 | DP-QPSK + LDPC 9216 × 3072 | 2/3 | 2.67 |
| 2 | DP-QPSK + LDPC 15360 × 3072 | 4/5 | 3.2 |
| 3 | DP-QPSK + LDPC 24576 × 3072 | 7/8 | 3.5 |
| 4 | DP-QPSK + LDPC 36864 × 3072 | 11/12 | 3.67 |
| 5 | DP-16QAM + LDPC 9216 × 3072 | 2/3 | 5.33 |
| 6 | DP-16QAM + LDPC 15360 × 3072 | 4/5 | 6.4 |
| 7 | DP-16QAM + LDPC 24576 × 3072 | 7/8 | 7 |
| 8 | DP-16QAM + LDPC 36864 × 3072 | 11/12 | 7.33 |
| 9 | DP-64QAM + LDPC 9216 × 3072 | 2/3 | 8 |
| 10 | DP-64QAM + LDPC 15360 × 3072 | 4/5 | 9.6 |
| 11 | DP-64QAM + LDPC 24576 × 3072 | 7/8 | 10.5 |
| 12 | DP-64QAM + LDPC 36864 × 3072 | 11/12 | 11 |

Operation Principles and Implementation of Adaptive MCS

Figure 11:
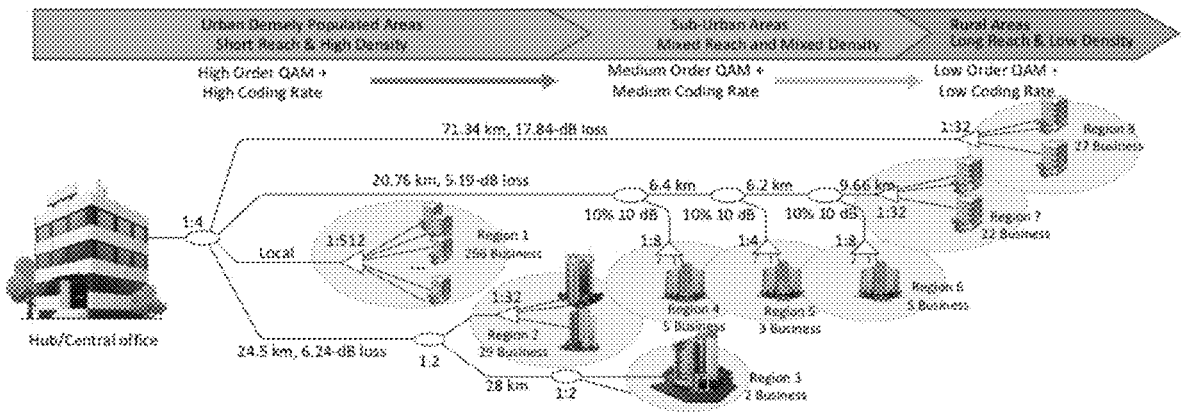
FIG. 11 illustrates aspects of a coherent-PON system with adaptive MCS to support various user-density and fiber-reach distributions.

The implementation of the proposed adaptive MCS in a large-scale PON system is shown in FIG. 11. The conceptualized network originates from anonymized topology data of a cable operator in the United States. As observed from FIG. 11, there are more than 300 fiber nodes widely distributed across an urban area, sub-urban area, and rural area. The users distributed in the urban and rural areas are featured by high density with short reach distances and low density with long transmission distances respectively, while the users in the sub-urban area have a mixed subscriber density and fiber reach between the other two cases. The overall transmission distance ranged from less than 1 km to 71.34 km. The split ratio varied from 1:16 to less than 1:1024. In such a network with diversified channel conditions, traditional fixed MCS strategy requires us to sacrifice either transmission distance to gain higher data rate or to compromise on data rate for a wide coverage. It can hardly optimize the two aspects simultaneously. However, an adaptive coded modulation scheme enables tailoring the MCS profile for different channel conditions to fully utilize the power margin. For the densely populated urban areas, high-order QAM plus high-coding-rate FEC can be used to support the large bandwidth demand and high user density. On the other hand, in the faraway low-density rural areas, low-order QAM plus low-coding-rate FEC is recommended to extend the fiber transmission distance and improve the network reliability. By combining the modulation and FEC, the MCS can even be dynamically adjusted to cover different user density, transmission distance, reliability, and energy consumption.

In traditional PON or OTN, one challenge for implementing modulation adaptation comes from the sparsity of the modulation options. However, in coherent optics, by combining DP-QPSK, DP-16QAM, and DP-64QAM as well as LDPC FEC codes with the coding rate varied from 11/12 to 2/3, abundant MCS options can be achieved as shown in Table 2. There are in total 12 options with the effective bit per symbol varied from 2.67 to 11 bit/symbol. It is worth noticing that all the LDPC codes here are generated from the same mother parity-check matrix with the size of 49152 by 3072. By shortening the size of the information bits, the coding rate is tuned among 11/12, 7/8, 4/5, and 2/3, respectively. These shortened information bits will be replaced by 0. They will be truncated after the encoding and do not participate in the transmission process. Since all the shortened LDPC options reuse the same encoding and decoding matrix, it requires minimal changes of the original LDPC encoder and decoder, thus reducing the complexity and cost in upgrading ASIC and algorithms.

Figure 12A:
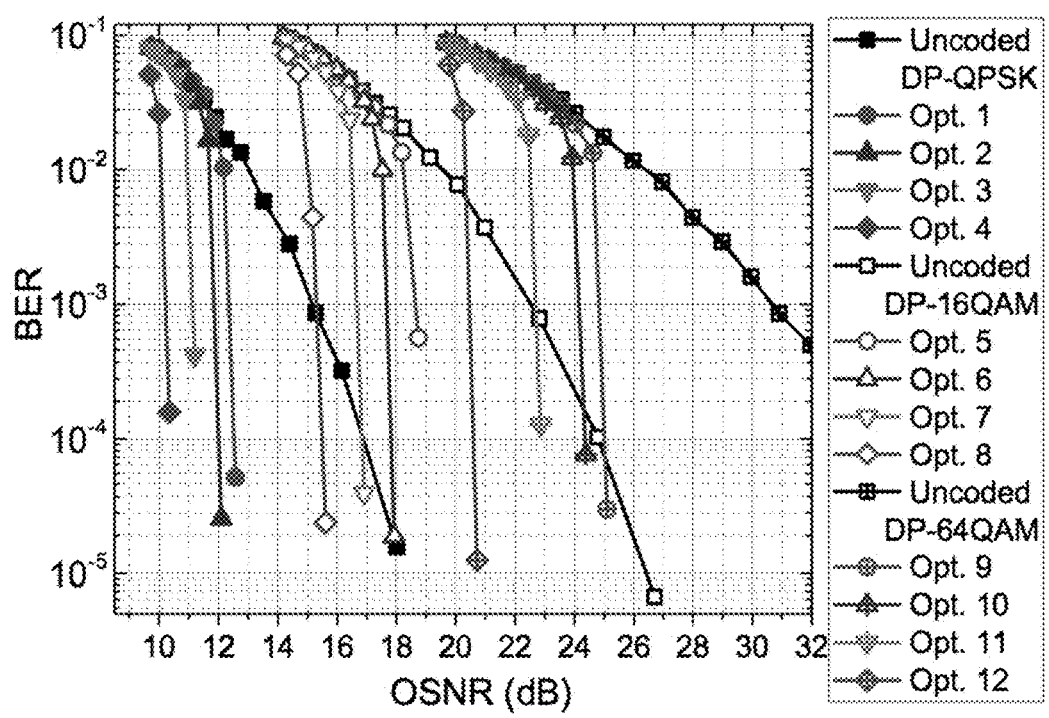
FIG. 12A shows experimental results of BER versus OSNR for different MCS options, according to an embodiment.
Figure 12B:
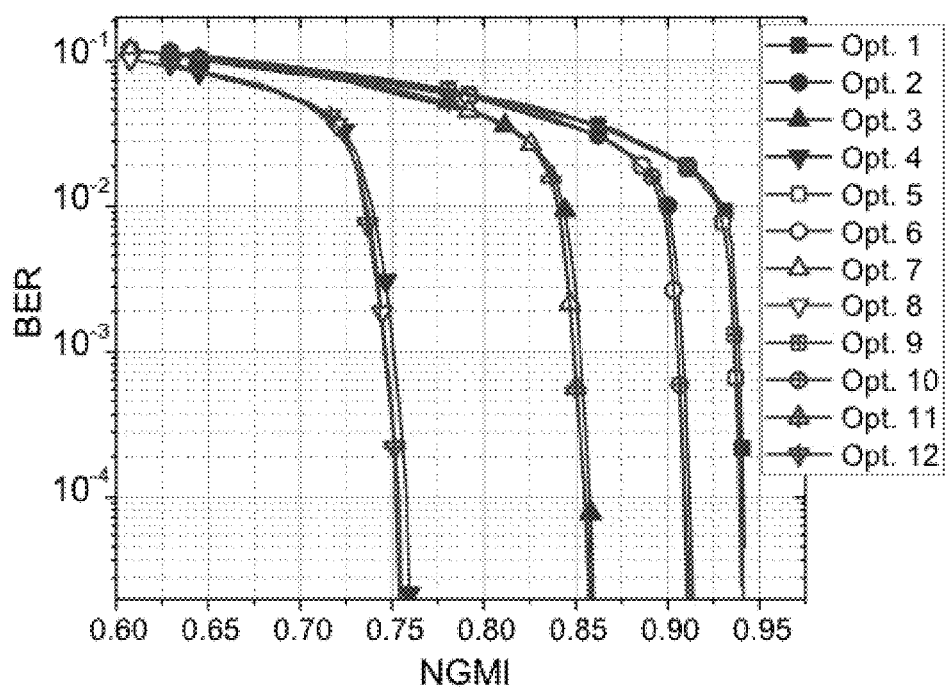
FIG. 12B shows simulated BER versus NGMI under different formats, according to an embodiment.
Figure 12C:
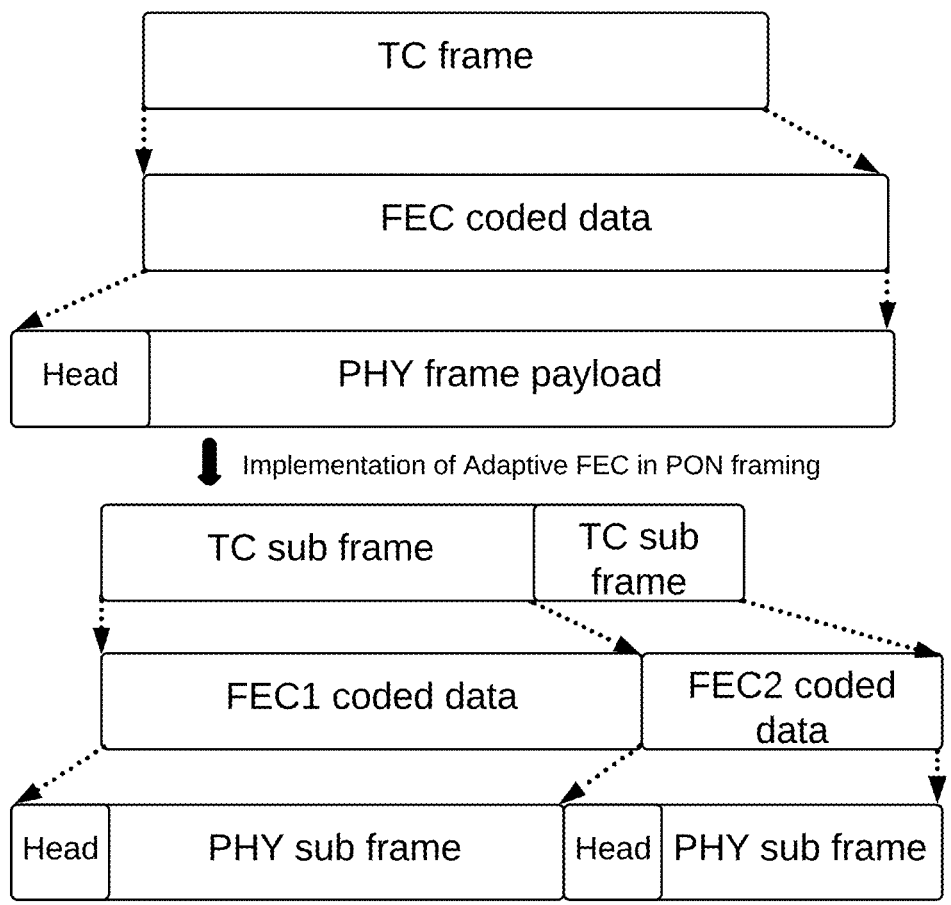
FIG. 12C shows implementation of adaptive FEC by upgrading existing framing structure with transmission-convergence (TC) sub-frames.

The experimental results of the bit-error rate (BER) versus OSNR are shown in FIG. 12A. In the coherent optical testbed. The transmitter is composed of an 80-GSa/s four-channel arbitrary waveform generator (AWG) as the signal generator, a 1550-nm 15-dBm external cavity laser (ECL) as the light source, and a dual-polarization coherent driver modulator (DP-CDM) as the electrical-to-optical signal converter. The signal baud rate is fixed at 32GBd. At the receiver, the signals are detected by a coherent receiver and demodulated by offline DSP. Given by the results, through fitting-based estimation, the OSNR limits at 1E-15 output BER for Option 1 to 12 under 32-GBd operation are estimated as 10.7, 11.6, 12.4, 13.1, 16.1, 17.4, 18.4, 19.4, 21.1, 23.2, 24.8, and 25.5 dB respectively in the lab environment. FIG. 12B shows the simulated results of BER versus normalized general mutual information (NGMI). It is worth noticing that the implementation of the adaptive MCS is highly compatible with the existing PON specifications requiring only a few amendments. Taking the traditional XG-PON standard (ITU-T G987.3) as an example, the downlink (DL) XG-PON transmission convergence (XGTC) and physical-layer (PHY) framing only allows one encoding method for the 125-us timing window as shown in FIG. 12C. However, in the XG-PON uplink, multiple XGTC bursts coexist in one framing window and the optical line terminal (OLT) can dynamically activate/deactivate the FEC for each burst in the physical layer operation, administration, and management (PLOAM) field. The FEC switching mechanism of XG-PON UL can be enhanced and expanded to the new PON standard by splitting one transmission convergence (TC) frame into multiple TC subframes mapping to different users. Each subframe is allowed to select its own MCS option. The MCS profile for different optical network units (ONU) will be set in advance using PLOAM profile message in the PON system.

Results and Discussions

Figure 13A:
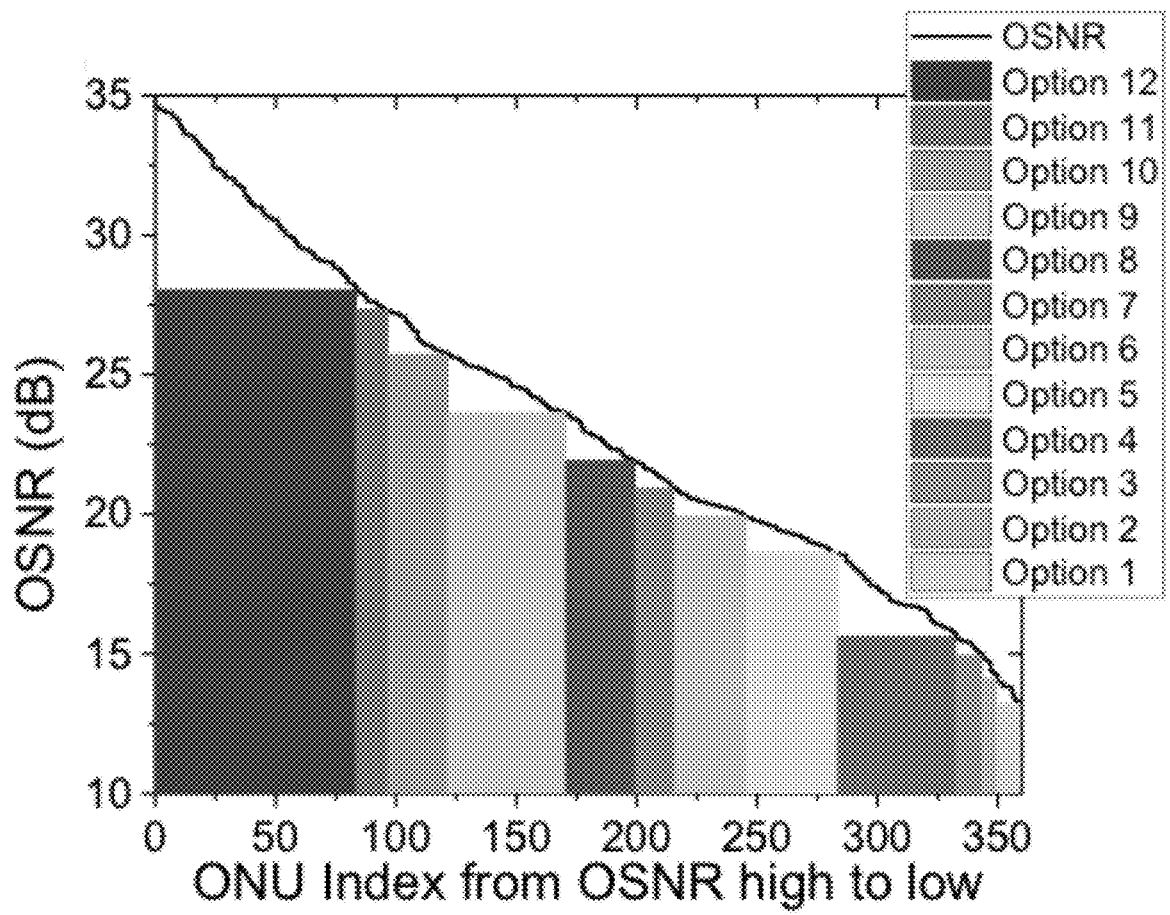
FIG. 13A shows the distribution of downlink OSNR from high to low and MCS loading profile for all the ONUs, according to an embodiment.
Figure 13B:
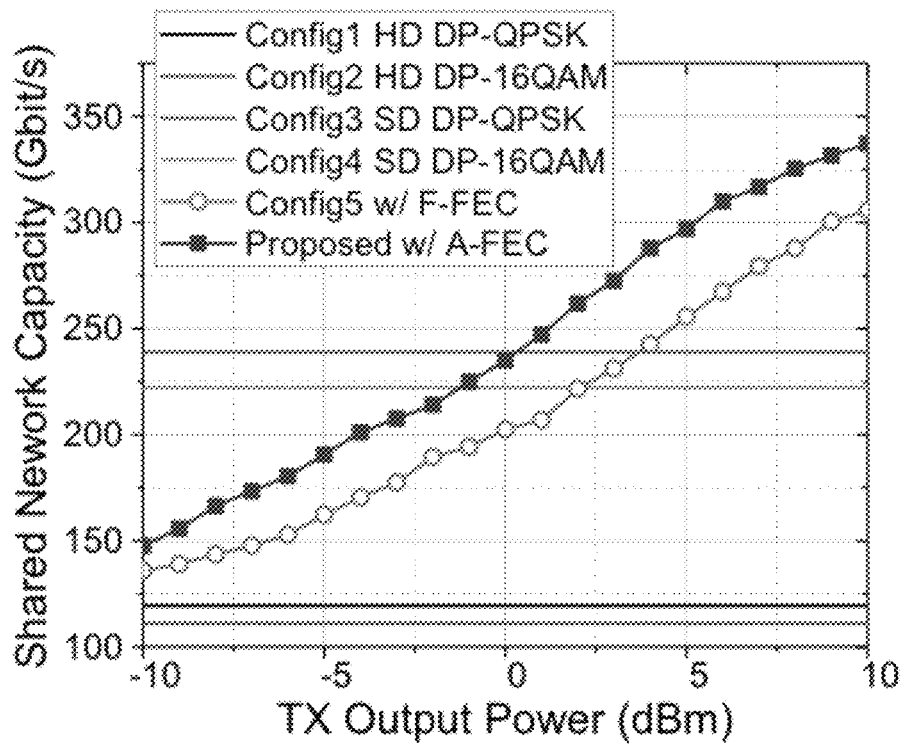
FIG. 13B shows shared network capacity versus transmitter output power based on different MCS configurations. (F-FEC: Fixed FEC; A-FEC: Adaptive FEC)
Figure 13C:
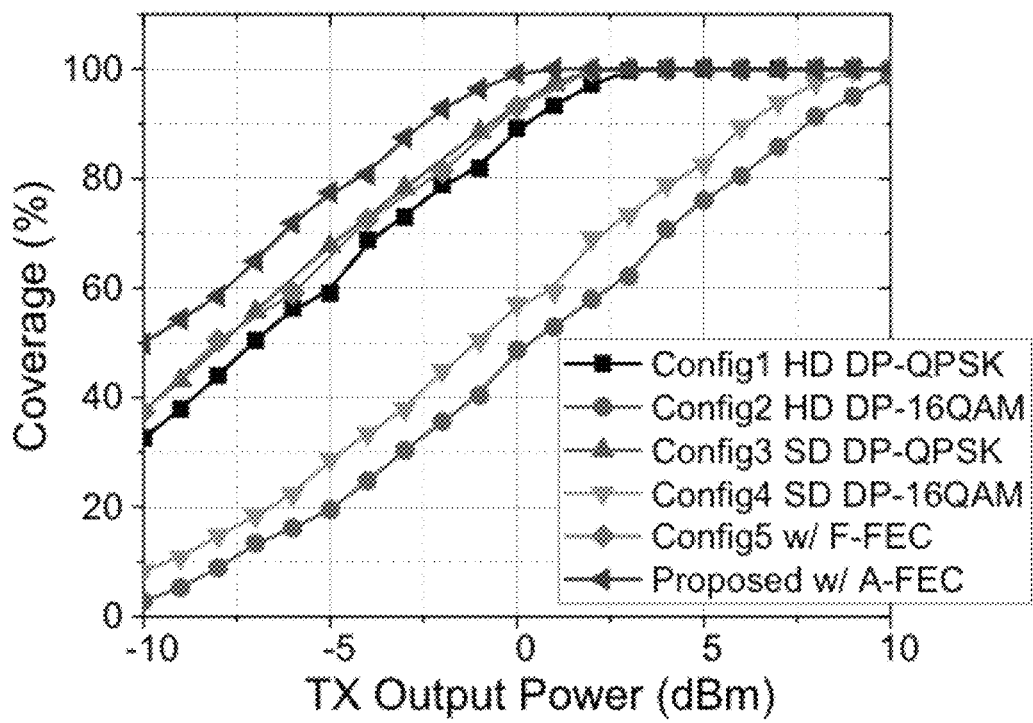
FIG. 13C shows coverage versus transmitter output power based on different MCS configurations. (F-FEC: Fixed FEC; A-FEC: Adaptive FEC)

To further study the impacts from adaptive MCS towards the performance and coverage, we performed simulations by implementing the proposed coded modulation over a PON system constructed from an operator's network topology data. There are in total 359 fiber end nodes distributed with a large variance in user density and transmission distance. Based on the distance and split ratio between the headend and the fiber nodes, the OSNR at the receiver side can be estimated using the method in OSNR link budget methodology, IEEE P802.3cn. By ranking from high to low, the OSNR distribution versus the ONU index is shown in FIG. 13A. One MCS option can be allocated to a certain ONU if the OSNR meets the error-free operation criterion. It is worth mentioning that in order to guarantee the error-free performance, the OSNR threshold is set above the 1E-15 operation limit with around a 2.5-dB margin. The result of MCS loading with DL transmitter output power at 0 dBm is shown in FIG. 13A. Another five configurations are also applied for comparing the performance against the traditional approach. Configurations 1 to 4 are based on fixed MCS referred to in ITU-T G.709.3, Flexible OTN long-reach interface, Amendment1. Configurations 1 and 2 respectively use 32GBd DP-QPSK and DP-16QAM plus 512×510 hard-decision (HD) staircase code. Configurations 3 and 4 respectively apply 32GBd DP-QPSK and DP-16QAM coded by soft-decision (SD) (128,119) Hamming plus HD 512×510 staircase code. Configuration 5 uses the same MCS loading algorithm with DP-QPSK, DP-16QAM and DP-64QAM encoded by the fixed FEC same as Configuration 3. The coverage is the ratio between the number of active ONUs and total ONUs. From FIGS. 13B and 13C, at a lower transmitter power, shared network capacity of the proposed method is between the fixed DP-QPSK and DP-16QAM schemes, since, at this stage, it mainly uses combinations of DP-QPSK and DP-16QAM with variable coding rates. However, the region coverage of the proposed method is significantly larger than the others since it allows DP-QPSK at a lower coding rate. In Configurations 1 to 4 with fixed MCS, a lot of rural ONUs are offline because of the OSNR below the threshold, resulting in a poorer coverage. With transmitter output power higher than 0 dBm, the proposed scheme performs better in shared capacity because the improved OSNR enables higher-order QAM and FEC rate. At the different output power, a good trade-off is achieved between network capacity and coverage with the proposed adaptive MCS. In comparison, Configuration 5 can also realize a trade-off, but without using adaptive FEC, it does not fully utilize bandwidth resources and power budget resulting in a sub-optimal performance.

Conclusion

A joint adaptation for coherent modulation and FEC in coherent-PON systems with a significantly enhanced coverage and network capacity has been developed and tested. FEC with tunable coding rate based on LDPC shortening is implemented with 32GBaud DP-QPSK, DP-16QAM, and DP-64QAM formats to achieve continuously varied shared data rates from 85.4 Gbit/s to 352 Gbit/s to support low-density long-reach rural areas and high-density short-reach urban areas simultaneously. The performance of the MCS options has been experimentally verified and simulations based on real network topology data were conducted. It is confirmed that the adaptive MCS method can achieve increased network capacity and extended transmission distance with an optimal balance between capacity and coverage.

REFERENCES

[1] J. Zhang et al., *J. Opt. Commun. Netw.*, vol. 13, no. 2, 2021.
[2] ITU-T G.709.3, Flexible OTN long-reach interface, Amendment1.
[3] ITU-T G.975.1, FEC for high bit-rate DWDM submarine systems.
[4] Y. Zhang and I. B. Djordjevic, O F C 2014, paper M3A.6.
[4] Y. Zhang and I. B. Djordjevic, O F C 2014, paper M3A.6.
[5] X. Sun and I. B. Djordjevic, Optics Express, vol. 27, no. 3, 2019.
[6] X. Liu, et al., *IEEE Commun. Lett.*, vol. 13, no. 9, 2009.
[7] ITU-T G.987.3, XG-PON: transmission convergence (TC) layer.
[8] OSNR link budget methodology, IEEE P802.3cn public documentation.

Although examples of coherent passive optical networks have been discussed herein, the adaptive modulation coding schemes of the present disclosure may be used in other types of networks including, but not limited to, hybrid fiber coaxial networks, satellite networks, wireless networks (e.g., 802.11x, 3G, 4G, 5G, 5G-NR, LTE) and optical networks (e.g., PON, CPON, free-space).

STATEMENTS REGARDING INCORPORATION BY REFERENCE AND VARIATIONS

All references cited throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments, exemplary embodiments and optional features, modification and variation of the concepts herein disclosed can be resorted to by those skilled in the art, and that such modifications and variations are considered to be within the scope of this invention as defined by the appended claims. The specific embodiments provided herein are examples of useful embodiments of the invention and it will be apparent to one skilled in the art that the invention can be carried out using a large number of variations of the devices, device components, and method steps set forth in the present description. As will be apparent to one of skill in the art, methods, software and apparatus/devices can include a large number of optional elements and steps. All art-known functional equivalents of materials and methods are intended to be included in this disclosure. Nothing herein is to be construed as an admission that the invention is not entitled to antedate such disclosure by virtue of prior invention.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure.

It must be noted that as used herein and in the appended claims, the singular forms "a", "an", and "the" include plural reference unless the context clearly dictates otherwise. Thus, for example, reference to "a processor" includes a plurality of such processors and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are described.

Whenever a range is given in the specification, for example, a range of integers, a temperature range, a time range, a composition range, or concentration range, all intermediate ranges and subranges, as well as all individual values included in the ranges given are intended to be included in the disclosure. As used herein, ranges specifically include the values provided as endpoint values of the range. As used herein, ranges specifically include all the integer values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous and can be used interchangeably with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" can be replaced with either of the other two terms. The invention illustratively described herein suitably can be practiced in the absence of any element or elements, limitation or limitations which is/are not specifically disclosed herein.

What is claimed is:

1. A method for improving spectral efficiency of an optical telecommunication network based on use of a first modulation coding schemes (MCS) for communication with a first end device in operable communication with a hub of the optical communication network, the method comprising the steps of:
    selecting the first MCS for a first telecommunication signal to be exchanged between the hub and the first end device over a first channel of the optical telecommunication network, wherein the first telecommunication signal includes a first bandwidth and a first dynamic range, wherein the first MCS includes a first modulation format having an integer order and configured to maximize the first dynamic range such that the first dynamic range does not exceed a signal parameter threshold of the first channel over the first bandwidth;
    indexing the first telecommunication signal into a plurality of adjacent sub-signals, wherein each adjacent sub-signal of the plurality of adjacent sub-signals spans a second bandwidth less than and within the first bandwidth; and
    dynamically adjusting a first adjacent sub-signal to achieve a second dynamic range (a) greater than the first dynamic range, and (b) that does not exceed the signal parameter threshold of the channel within a first frequency range of the second bandwidth of the first adjacent sub-signal,
    wherein the step of dynamically adjusting the first adjacent sub-signal is based on sub-steps of (a) modifying the first modulation format by a non-integer fraction of the first modulation format, and (b) applying a different coding rate to the first adjacent sub-signal than is applied to at least one other adjacent sub-signal of the plurality of adjacent sub-signals.

2. The method of claim 1, wherein a signal parameter of the signal parameter threshold is selected from the group consisting of generalized mutual information (GMI), normalized generalized mutual information (NGMI), bit error rate (BER), signal-to-noise ratio (SNR), signal-to-interference-noise ratio (SINR), optical signal-to-noise ratio (OSNR), power level, error vector magnitude (EVM) and combinations thereof.

3. The method of claim 2, wherein the signal parameter is the GMI or the NGMI, and wherein the GMI or the NGMI is specific to the channel, a wavelength, a distance, or an end device.

4. The method of claim 1, wherein the first coding rate utilizes a forward error correction (FEC) code including at least one of a Hamming code, a low-density parity check (LDPC), and a Reed-Solomon code.

5. The method of claim 4, wherein the FEC code includes the LDPC, and wherein the LDPC has been subjected to information shortening or parity puncturing.

6. The method of claim 1, wherein the first telecommunication signal is an uplink signal.

7. The method of claim 1, wherein the first adjacent sub-signal fills a portion of system margin between the first dynamic range and the signal parameter threshold.

8. An optical telecommunication network comprising:
    a hub in operable communication with a plurality of end devices;
    a processor in operable communication with the hub; and
    a memory device in operable communication with the process, wherein the memory device is configured to store computer-executable instructions therein, which, when executed by the processor, cause the processor to:
        select a first modulation coding scheme (MCS) for a first telecommunication signal to be exchanged between the hub and a first end device of the plurality of end devices over a first channel of the optical telecommunication network, wherein the first MCS has an integer order and configured to maximize the first dynamic range such that the first dynamic range does not exceed a signal parameter threshold of the first channel over the first bandwidth;

index the first telecommunication signal into a plurality of adjacent sub-signals, wherein each adjacent sub-signal of the plurality of adjacent sub-signals spans a second bandwidth less than and within the first bandwidth; and dynamically adjust a first adjacent sub-signal to achieve a second dynamic range (a) greater than the first dynamic range, and (b) that does not exceed the signal parameter threshold of the channel within a first frequency range of the second bandwidth of the first adjacent sub-signal, wherein the dynamic adjustment of the first adjacent sub-signal is based on (a) a modification to the first modulation format using a non-integer fraction of the first modulation format, and (b) an application of a different coding rate to the first adjacent sub-signal than is applied to at least one other adjacent sub-signal of the plurality of adjacent sub-signals.

9. The telecommunication network of claim 8, wherein the telecommunication network includes at least one of a hybrid fiber coaxial (HFC) network, a satellite network, a wireless network, a fiber optic network, a passive optical network (PON), a coherent PON (CPON), and a free-space optical (FSO) network.

10. The telecommunication network of claim 8, wherein a signal parameter of the signal parameter threshold is selected from the group consisting of generalized mutual information (GMI), normalized generalized mutual information (NGMI), bit error rate (BER), signal-to-noise ratio (SNR), signal-to-interference-noise ratio (SINR), optical signal-to-noise ratio (OSNR), power level, error vector magnitude (EVM) and combinations thereof.

11. The telecommunication network of claim 10, wherein the signal parameter is the GMI or the NGMI, and wherein the GMI or the NGMI is specific to the channel, a wavelength, a distance, or an end device.

12. The telecommunication network of claim 8, wherein the first coding rate utilizes a forward error correction (FEC) code including at least one of a Hamming code, a low-density parity check (LDPC), and a Reed-Solomon code.

13. The telecommunication network of claim 12, wherein the FEC code includes the LDPC, and wherein the LDPC has been subjected to information shortening or parity puncturing.

14. The telecommunication network of claim 8, wherein the first telecommunication signal is an uplink signal.

15. The telecommunication network of claim 8, wherein the hub includes at least one of an optical line terminal (OLT), a Modem Termination System (MTS), a Cable MTS (CMTS), a mobile core, an evolved packet core (EPC), and a converged cable access platform (CCAP) core.

16. The telecommunication network of claim 8, wherein the plurality of end devices includes one or more of a base station, a node, an optical network unit (ONU), a modem, a gateway, a user equipment device, a remote radio head, a remote-PHY device, or a remote MAC-PHY device.

17. The telecommunication network of claim 8, further comprising an optical splitter.

18. The telecommunication network of claim 8, further comprising a first passive optical node arranged in series with a second passive optical node.

19. The telecommunication network of claim 8, wherein the first adjacent sub-signal is configured to fill a portion of system margin between the first dynamic range and the signal parameter threshold.

20. A non-transitory computer-readable medium having a plurality of non-transitory computer-executable instructions stored therein, the non-transitory computer-readable medium being in operable communication with a processor configured for improving spectral efficiency of an optical telecommunication network based on use of modulation coding schemes (MCSs) for a first end device of a plurality of end devices in operable communication with a hub of the optical telecommunication network, when executed by the processor, the plurality of non-transitory instructions cause the processor to:

select a first MCS for a first telecommunication signal to be exchanged between a hub and the first end device over a first channel of the optical telecommunication network, wherein the first MCS has an integer order and configured to maximize the first dynamic range such that the first dynamic range does not exceed a signal parameter threshold of the first channel over the first bandwidth;

index the first telecommunication signal into a plurality of adjacent sub-signals, wherein each adjacent sub-signal of the plurality of adjacent sub-signals spans a second bandwidth less than and within the first bandwidth; and dynamically adjust a first adjacent sub-signal to achieve a second dynamic range (a) greater than the first dynamic range, and (b) that does not exceed the signal parameter threshold of the channel within a first frequency range of the second bandwidth of the first adjacent sub-signal, wherein the dynamic adjustment of the first adjacent sub-signal is based on (a) a modification to the first modulation format using a non-integer fraction of the first modulation format, and (b) an application of a different coding rate to the first adjacent sub-signal than is applied to at least one other adjacent sub-signal of the plurality of adjacent sub-signals.

21. The non-transitory computer-readable medium of claim 20, wherein a signal parameter of the signal parameter threshold is selected from the group consisting of generalized mutual information (GMI), normalized generalized mutual information (NGMI), bit error rate (BER), signal-to-noise ratio (SNR), signal-to-interference-noise ratio (SINR), optical signal-to-noise ratio (OSNR), power level, error vector magnitude (EVM) and combinations thereof.

22. The non-transitory computer-readable medium of claim 20, wherein the first adjacent sub-signal is configured to fill a portion of system margin between the first dynamic range and the signal parameter threshold.

* * * * *